US012596398B2

(12) United States Patent
Eom

(10) Patent No.: US 12,596,398 B2
(45) Date of Patent: Apr. 7, 2026

(54) FLEXIBLE ELECTRONIC DEVICE AND OPERATION METHOD THEREOF

(71) Applicant: SAMSUNG ELECTRONICS CO., LTD., Suwon-si (KR)

(72) Inventor: Kihun Eom, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/009,547

(22) Filed: Jan. 3, 2025

(65) Prior Publication Data

US 2025/0138581 A1 May 1, 2025

Related U.S. Application Data

(63) Continuation of application No. PCT/KR2023/006389, filed on May 11, 2023.

(30) Foreign Application Priority Data

Aug. 16, 2022 (KR) ........................ 10-2022-0101870
Oct. 7, 2022 (KR) ........................ 10-2022-0128882

(51) Int. Cl.
*G06F 1/16* (2006.01)
*G09G 3/00* (2006.01)

(52) U.S. Cl.
CPC ........... *G06F 1/1618* (2013.01); *G09G 3/035* (2020.08)

(58) Field of Classification Search
CPC .. G09G 3/035; H04M 1/0214; H04M 1/0245; H04M 1/0268; H04M 1/72454;
(Continued)

(56) References Cited

U.S. PATENT DOCUMENTS 10,073,668 B2 9/2018 Chun et al.
10,393,516 B2 8/2019 Choi et al.
(Continued)

FOREIGN PATENT DOCUMENTS

EP 3 748 465 A1 12/2020
EP 3 896 946 A1 10/2021
(Continued)

OTHER PUBLICATIONS

International Search Report dated Sep. 1, 2023, issued by the International Searching Authority in International Application No. PCT/KR2023/006389.
(Continued)

*Primary Examiner* — Richard J Hong
(74) *Attorney, Agent, or Firm* — Sughrue Mion, PLLC

(57) ABSTRACT

Provided are a flexible electronic device and an operation method thereof. The electronic device may include a housing, a flexible display including a first portion and a second portion, a first sensor and a second sensor, a third sensor, at least one processor, and a memory. The processor may monitor whether or not the flexible display switches from a folded state to an unfolded state using the third sensor. The processor may at least partially activate the first sensor and the second sensor, based on the case where the flexible display switches from the folded state to the unfolded state. The processor may measure relative position and/or angle of the first portion and the second portion in the flexible display using the first sensor and the second sensor. In addition, various other embodiments may be provided.

15 Claims, 15 Drawing Sheets

(58) Field of Classification Search

CPC .. H04M 1/0243; G06F 1/1618; G06F 1/1641; G06F 1/1652; G06F 1/1677; G06F 1/1694; G06F 1/3215; G06F 1/3231; G06F 1/3287; G06F 2203/04803; G06F 3/0481; G06F 3/04845; G06F 1/1684; G06F 3/1446; G06F 3/1423

See application file for complete search history.

(56) References Cited

U.S. PATENT DOCUMENTS

| | | | |
|---|---|---|---|
| 11,300,995 | B2 | 4/2022 | Eom et al. |
| 12,050,834 | B2 | 7/2024 | Kim et al. |
| 12,094,393 | B2 | 9/2024 | Kwon et al. |
| 2013/0325386 | A1 | 12/2013 | Takano |
| 2016/0012797 | A1 | 1/2016 | Lee et al. |
| 2017/0016720 | A1* | 1/2017 | Choi ..................... G06F 1/1652 |
| 2017/0075640 | A1* | 3/2017 | Chun ..................... G06F 3/1423 |
| 2020/0379516 | A1* | 12/2020 | Park ...................... G06F 1/1684 |
| 2021/0409531 | A1 | 12/2021 | Shim et al. |
| 2022/0122514 | A1* | 4/2022 | Kwon ................... G06F 3/1446 |
| 2022/0214852 | A1* | 7/2022 | Kim ...................... G06F 1/1652 |
| 2024/0303021 | A1* | 9/2024 | Kim ...................... G06F 1/3287 |

FOREIGN PATENT DOCUMENTS

| | | | | |
|---|---|---|---|---|
| EP | 4057135 | A1 * | 9/2022 | .......... H04M 1/0243 |
| EP | 4421626 | A1 * | 8/2024 | ........ H04M 1/72454 |
| KR | 10-2014-0094333 | A | 7/2014 | |
| KR | 10-2017-0031525 | A | 3/2017 | |
| KR | 10-2020-0124402 | A | 11/2020 | |
| KR | 10-2021-0017038 | A | 2/2021 | |
| KR | 10-2021-0035528 | A | 4/2021 | |
| WO | 2020/256168 | A1 | 12/2020 | |

OTHER PUBLICATIONS

Written Opinion dated Sep. 1, 2023, issued by the International Searching Authority in International Application No. PCT/KR2023/006389.

Extended European Search Report dated Sep. 3, 2024, issued by the European Patent Office in European Application No. 23734894.1.

* cited by examiner

—— open → close (folding)

- - - - close → open (unfolding)

FLEXIBLE ELECTRONIC DEVICE AND OPERATION METHOD THEREOF

CROSS-REFERENCE TO RELATED APPLICATIONS

This application is a bypass continuation application of International Application No. PCT/KR2023/006389 filed on May 11, 2023, which is based on and claims priority to Korean Patent Application No. 10-2022-0101870, filed on Aug. 16, 2022, and Korean Patent Application No. 10-2022-0128882, filed on Oct. 7, 2022, in the Korean Intellectual Property Office, the disclosures of which are incorporated by reference herein in their entireties.

BACKGROUND

1. Field

The disclosure relates to an electronic device and an operation method thereof and, more particularly, to a flexible type electronic device and an operation method thereof.

2. Description of Related Art

Electronic devices have complex functions such as taking pictures or videos, playing music files or video files, playing games, receiving broadcasts, supporting the wireless Internet, and the like, and are implemented in the form of comprehensive multimedia players. Accordingly, electronic devices are developing into new forms in terms of hardware or software in order to enhance portability and convenience while satisfying users' needs. As an example of such development, an electronic device may be implemented as a flexible type.

A flexible type electronic device may change in a mechanical state thereof by a user gesture. In addition, the flexible type electronic device may perform various operations, based on a change in the mechanical state.

When a user gesture for changing the mechanical state of a flexible-type electronic device occurs, if the mechanical state change (e.g., a folding angle) fails to be accurately recognized, a malfunction may occur or usability may deteriorate. In order to prevent occurrence of malfunction or deterioration in usability, sensors for determining the mechanical state change may be needed.

For example, the electronic device may calculate a folding angle using an acceleration sensor. The characteristics of the acceleration sensor, which measures an angle (absolute angle) based on the direction of gravity (or the vertical direction), may cause measurement errors in the case where the electronic device is folded or unfolded in a vertical position or where there is a lot of physical vibration around the electronic device.

For example, the electronic device may calculate a folding angle using both an acceleration sensor and a gyro sensor. The gyro sensor is a sensor that calculates an angle by continuously accumulating and summating the amount of change in position and/or angle, and a folding angle (a relative angle to that in the previous state) may be measured using the gyro sensor having relatively high accuracy and the data measured by the gyro sensor may be corrected using the acceleration sensor, thereby improving measurement accuracy. However, the characteristics of the gyro sensor that continuously (cumulatively) summates measurement data to obtain a folding angle may increase power consumption.

For example, the electronic device may calculate a folding angle using a Hall sensor. When calculating a folding angle using a Hall sensor, the measurement accuracy may be lowered by the influence of surrounding magnetic materials (e.g., magnets for double-sided binding when folding, digitizers, and antenna parts) due to the characteristics of the Hall sensor that measures an angle, based on a change in the intensity of magnetic force.

SUMMARY

Various embodiments of the disclosure are intended to provide a method and a device capable of increasing the accuracy in determining a mechanical state change of an electronic device by selectively using sensors having different characteristics depending on their uses.

Various embodiments are intended to provide a method and a device capable of determining a mechanical state change with relatively low power consumption using sensors having different characteristics in a flexible type electronic device.

Various embodiments are intended to provide a method and a device capable of simplifying a sensor arrangement structure in a flexible type electronic device.

Various embodiments are intended to provide a method and a device capable of improving usability by determining a mechanical state change of a flexible type electronic device depending on a situation of the electronic device or at the time desired by a user.

The technical problems to be solved in this document are not limited to the technical problems mentioned above, and other technical problems not mentioned above may be clearly understood by those skilled in the art to which the disclosure pertains from the description below.

An electronic device according to various embodiments may include a housing, a flexible display including a first portion and a second portion, a first sensor and a second sensor disposed in the housing, a third sensor disposed in the housing, at least one processor operatively connected to the flexible display, the first sensor, the second sensor, and the third sensor, and a memory operatively connected to the at least one processor, wherein the memory may store instructions that, when executed, cause the at least one processor to monitor whether or not the flexible display switches from a folded state to an unfolded state using the third sensor, at least partially activate the first sensor and the second sensor, based on the case where the flexible display switches from the folded state to the unfolded state, and measure relative position and/or angle of the first portion and the second portion in the flexible display using the first sensor and the second sensor.

An operation method of an electronic device according to various embodiments may include monitoring whether or not a flexible display of the electronic device switches from a folded state to an unfolded state using a third sensor in the electronic device, at least partially activating a first sensor and a second sensor in the electronic device, based on the case where the flexible display switches from the folded state to the unfolded state, and measuring relative position and/or angle of a first portion and a second portion in the flexible display using the first sensor and the second sensor.

According to various embodiments, it is possible to increase the accuracy in determining a mechanical state change by selectively using sensors having different characteristics depending on their uses in a flexible thereby electronic device.

According to various embodiments, it is possible to determine a mechanical state change with relatively low power consumption using sensors having different characteristics in a flexible type electronic device.

According to various embodiments, it is possible to simplify a sensor arrangement structure in a flexible type electronic device without deterioration of performance.

According to various embodiments, it is possible to improve usability of a user by determining a mechanical state change depending on a situation of a flexible type electronic device or at the time desired by a user.

The effects obtainable from the disclosure are not limited to the effects mentioned above, and other effects not mentioned above may be clearly understood by those skilled in the art to which the disclosure pertains from the description below.

DETAILED DESCRIPTION

Figure 1:
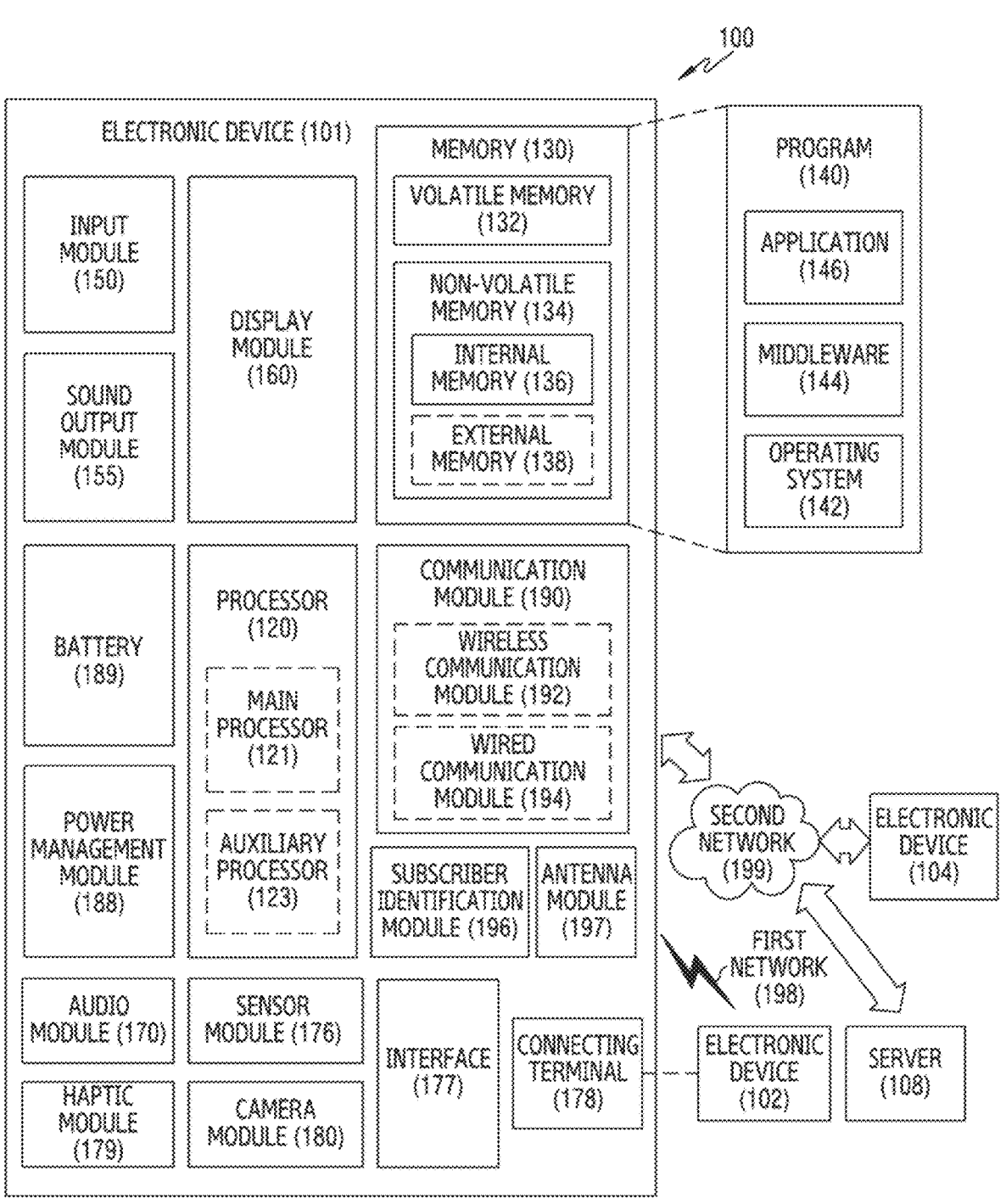
FIG. 1 is a block diagram of an electronic device in a network environment according to various embodiments.

Hereinafter, the embodiments of the disclosure will be described in detail with reference to the drawings so that those skilled in the art to which the disclosure pertains may easily practice them. However, the disclosure may be implemented in many different forms and is not limited to the embodiments described herein. In connection with the description of the drawings, the same or similar reference numerals may be used for the same or similar elements. In addition, descriptions of well-known functions and configurations may be omitted for clarity and conciseness from the drawings and related descriptions.

FIG. 1 is a block diagram of an electronic device in a network environment, according to various embodiments.

FIG. 1 is a block diagram of an electronic device in a network environment, according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
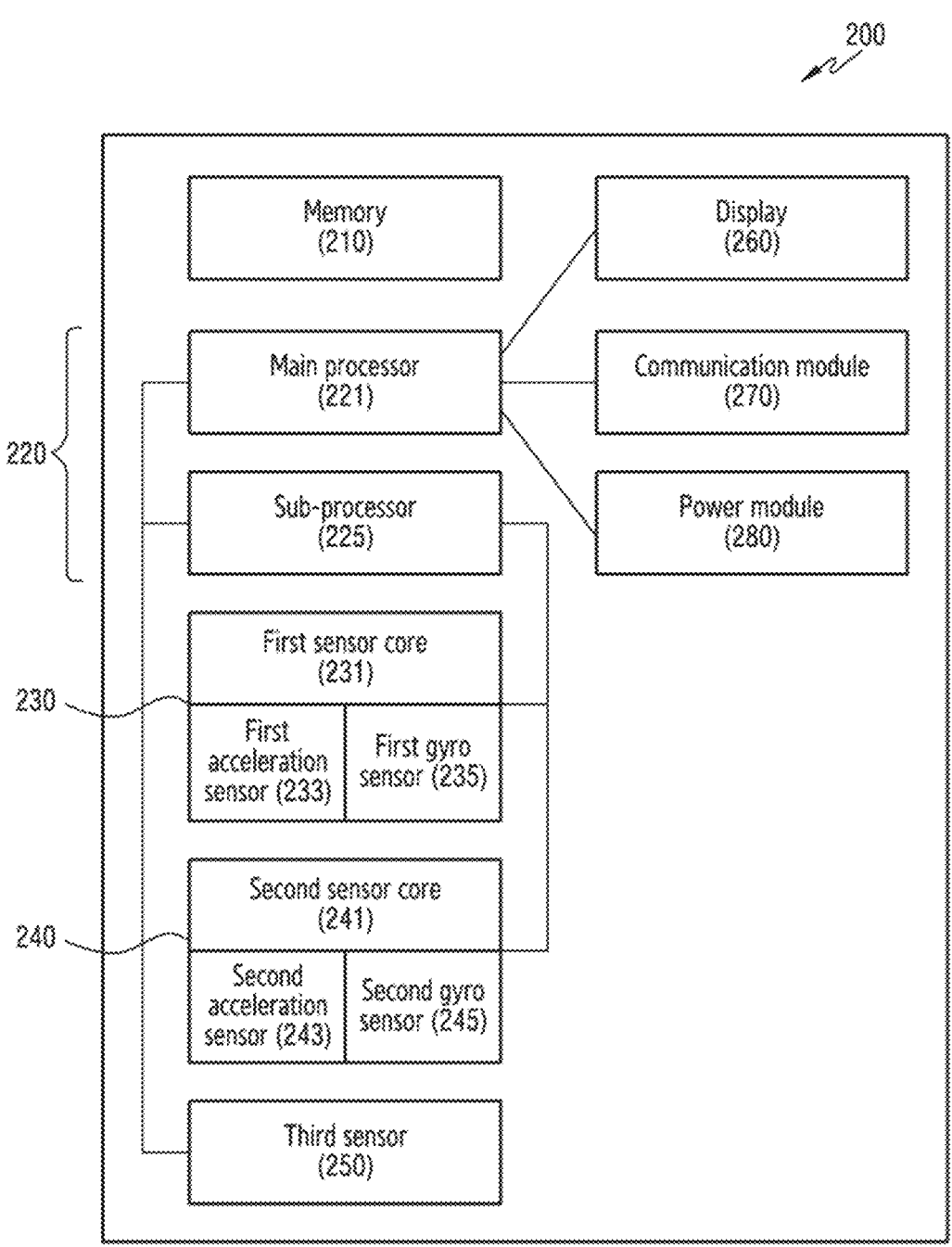
FIG. 2 is a simplified block diagram of an electronic device according to an embodiment.

FIG. 2 is a simplified block diagram of an electronic device according to an embodiment.

An electronic device according to an embodiment may be the electronic device 200 in FIG. 2. The electronic device 200 may be a flexible electronic device capable of changing a mechanical state (e.g., folding or unfolding) or having one or more change states (e.g., a folded state or an unfolded state).

Referring to FIG. 2, the electronic device 200 may include a memory 210, a processor 220, one or more sensors 230, 240, and 250, and a display 260. The electronic device 200 may further include a communication module 270 and/or a power module 280.

In an embodiment, elements included in the electronic device 200 may be electrically and/or operatively connected to each other to exchange signals (e.g., commands or data) with each other.

Elements of the electronic device 200 shown in FIG. 2 may correspond to the elements of the electronic device 101 shown in FIG. 1. For example, the memory 210 may correspond to the memory 130 in FIG. 1. The processor 220 may correspond to the processors 120, 121 or 123 in FIG. 1. One or more sensors 230, 240, and 250 may correspond to the sensor module 176 in FIG. 1. The display 260 may correspond to the display module 160 in FIG. 1. The communication module 270 may correspond to the communication module 190 in FIG. 1. The power module 280 may include the power management module 188 and/or the battery 189 in FIG. 1.

In some embodiments, the electronic device 200 may include additional elements other than those shown in FIG.

2. Alternatively, at least one of the elements shown in FIG. 2 may be omitted or at least two thereof may be integrated.

In an embodiment, the display 260 of the electronic device 200 may be a flexible display. For example, the display 260 may include a main display 330 in FIG. 3A and a sub-display 350 in FIG. 3B.

In an embodiment, the display 260 includes a first portion (e.g., the first housing 312 in FIG. 3A) and a second portion (e.g., the second housing 314 in FIG. 3A) that are change-able relative to each other in position and/or angle.

In an embodiment, the processor 220 in the electronic device 200 may include at least one processor. For example, the processor 220 may include a main processor 221 and/or a sub-processor 225. The main processor 221 may corre-spond to the main processor 121 (e.g., an application pro-cessor) in FIG. 1, and the sub-processor 225 may correspond to the auxiliary processor 123 (e.g., a sensor hub processor or a low-power processor) in FIG. 1.

In an embodiment, the main processor 221 may execute and/or control various functions supported by the electronic device 200. The main processor 221 may control at least some of the memory 210, the display 260, the communica-tion module 270 and the power module 280. A specified function (or logic) may be performed by the control. The main processor 221 may control the sub-processor 225 or control the first sensor 230, the second sensor 240, and/or the third sensor 250 by interworking with the sub-processor 225.

In an embodiment, the sub-processor 225 may operate as a processor dedicated to sensor control. The sub-processor 225 may interwork with the main processor 221. The sub-processor 225 may obtain and/or process data related to the change state and degree of change of the electronic device 200 (or display 260) using one or more sensors 230, 240, and 250.

In an embodiment, the processor 220 may execute an application (e.g., the application 146 in FIG. 1) by executing codes or instructions written in a programming language stored in the memory 210 of the electronic device 200 and control a variety of hardware.

In an embodiment, the operation of the processor 220 may be performed as instructions stored in the memory 210 are executed. Alternatively, the processor 220 may execute instructions stored in the memory 210 to perform a specified function (or logic).

In an embodiment, one or more sensors 230, 240, and 250 may include a first sensor 230, a second sensor 240, and/or a third sensor 250. According to an embodiment, each of the first sensor 230, the second sensor 240, and the third sensor 250 may include one or more sensors. According to an embodiment, at least a part of the first sensor 230 and the second sensor 240 may be integrated.

In an embodiment, the first sensor 230 and the second sensor 240 may be intended for a "change-degree measure-ment function". The processor 220 may perform a change-degree measurement function using the first sensor 230 and the second sensor 240. The change-degree measurement function may be a function of measuring (or sensing or determining) the degree of change in the display 260 (or the electronic device 200). The degree of change in the display 260 may correspond to a relative position and/or angle between the first portion and the second portion of the display 260. For example, the degree of change in the display 260 may correspond to a folding angle.

In an embodiment, the first sensor 230 and the second sensor 240 may be substantially the same type of sensor. The first sensor 230 and the second sensor 240 may be different types of sensors from the third sensor 250.

In an embodiment, the first sensor 230 and the second sensor 240 may repeatedly measure the degree of change (e.g., a folding angle) of the display 260. For example, the first sensor 230 and the second sensor 240 may continuously accumulate (summate) the amount of change in position and/or angle that changes in real time using a higher current consumption than that of the third sensor 250, thereby measuring a folding angle, or measure a folding angle at a measurement time interval shorter than that of the third sensor 250.

In an embodiment, the first sensor 230 may include at least one sensor. The first sensor 230 may include a first gyro sensor 235. The first sensor 230 may further include a first sensor core 231 and a first acceleration sensor 233. For example, the first sensor 230 may be a 6-axis gyro accel-eration sensor including a first sensor core 231, a first acceleration sensor 233, and a first gyro sensor 235.

In an embodiment, the second sensor 240 may include at least one sensor. The second sensor 240 may include a second gyro sensor 245. The second sensor 240 may further include a second sensor core 241 and a second acceleration sensor 243. For example, the second sensor 240 may be a 6-axis gyro acceleration sensor including a second sensor core 241, a second acceleration sensor 243, and a second gyro sensor 245.

In an embodiment, the third sensor 250 may be a sensor for sensing whether or not the change state switches. For example, the change state may include a folded state and an unfolded state. The third sensor 250 may be used for a "change state monitoring function". The processor 220 may perform a change state monitoring function using the third sensor 250. For example, the change state monitoring func-tion may be a function of monitoring whether the change state of the display 260 (or the electronic device 200) is the folded state or the unfolded state. As another example, the change state monitoring function may be a function of monitoring whether or not the display 260 (or the electronic device 200) switches from a first state (e.g., any one of the folded state and the unfolded state) to a second state (e.g., the other of the folded state and the unfolded state).

According to an embodiment, the third sensor 250 may measure the relative position and/or angle of between the first portion and the second portion of the display 260, and sense whether or not the change state is switched based on the measured value. If the change state switch is sensed to switch, the third sensor 250 may generate a signal indicating the switch of the change state and output the signal to the processor 220.

In an embodiment, if an unfolding event in which the display 260 switches from the folded state to the unfolded state occurs, a measured value of the third sensor 250 may increase to a specified first reference value (e.g., 10 degrees) or more. The third sensor 250 may sense a switch to the unfolded state, based on the measured value. The third sensor 250 may transmit, to the processor 220, a first interrupt signal indicating a switch from the folded state to the unfolded state in response to the unfolding event.

In an embodiment, if a folding event in which the display 260 switches from the unfolded state to the folded state occurs, a measured value of the third sensor 250 may decrease to less than a specified second reference value (e.g., 20 degrees). The third sensor 250 may sense a switch to the folded state, based on the measurement value. The third sensor 250 may transmit, to the processor 220, a second interrupt signal indicating a switch from the unfolded state to the folded state in response to the folding event.

In an embodiment, the third sensor 250 may be a different type of sensor from the first sensor 230 and the second sensor 240. The third sensor 250 may roughly measure a degree of change in the display 260 (e.g., folding angle), compared to the first sensor 230 and the second sensor 240. The third sensor 250 may be physically and/or functionally configured to be different from the first sensor 230 and the second sensor 240. For example, the first sensor 230 and the second sensor 240 may be 6-axis gyro acceleration sensors, and the third sensor 250 may be a Hall sensor or a proximity sensor. The third sensor 250 may use a lower current consumption than the first sensor 230 and the second sensor 240 or have a longer measurement time interval than the third sensor 250.

In an embodiment, the third sensor 250 senses a switch in the change state of the display 260 (or the electronic device 200), based on the roughly measured degree of change in the display 260 (e.g., folding angle).

In an embodiment, the processor 220 may monitor whether or not the display 260 (or the electronic device 200) switches its change state through the third sensor 250 and, based on the monitoring, control whether or not to activate the first sensor 230 and/or the second sensor 240.

In an embodiment, the third sensor 250 may include at least one sensor. The at least one sensor may include a Hall sensor or a proximity sensor. For example, the third sensor 250 may include a Hall sensor (e.g., the Hall sensor 251 in FIG. 7) and a magnet (e.g., the magnet 255 in FIG. 7). For example, the Hall sensor (e.g., the Hall sensor 251 in FIG. 7) may be disposed at a position corresponding to the first portion (e.g., the first housing 312 in FIG. 7) of the display 260. The magnet (e.g., the magnet 255 in FIG. 7) may be disposed at a position corresponding to the second portion (e.g., the second housing 314 in FIG. 7) of the display 260.

In an embodiment, the processor 220 may monitor whether or not the display 260 (or the electronic device 200) switches from a folded state to an unfolded state using the third sensor 250.

In an embodiment, the change state of the display 260 (or the electronic device 200) may include a folded state (or closed state) and an unfolded state (or open state).

In an embodiment, the folded state of the display 260 (or the electronic device 200) may be a state in which the relative position and/or angle between the first portion and the second portion of the display 260 is less than a specified first reference value (e.g., 10 degrees). The unfolded state may be a state distinct from the folded state. The unfolded state may be a state in which the relative position and/or angle between the first portion and the second portion of the display 260 is greater than or equal to a specified first reference value (e.g., 10 degrees).

In an embodiment, the unfolded state may include a partially unfolded state and a fully unfolded state. For example, the partially unfolded state (or partially open state) may be a state in which the folding angle is greater than or equal to about 10 degrees and less than about 150 degrees. The fully unfolded state (or fully open state) may be a state in which the folding angle is greater than or equal to about 150 degrees and less than or equal to about 180 degrees.

For example, in the case where the electronic device 200 switches from the folded state (or closed state) to the partially unfolded state or fully unfolded state by a user's unfolding operation, a measured value of the third sensor 250 may become equal to or greater a specified first reference value. The measured value of the third sensor 250 may be a value corresponding to the relative position and/or angle between the first portion and the second portion of the display 260 (e.g., a folding angle or distance between the first housing 312 and the second housing 314 in FIG. 3A).

In an embodiment, the folded state of the display 260 (or the electronic device 200) may be a state in which the relative position and/or angle between the first portion and the second portion of the display 260 is less than a specified second reference value (e.g., 20 degrees). The unfolded state may be a state in which the relative position and/or angle between the first portion and the second portion of the display 260 is greater than or equal to a specified second reference value (e.g., 20 degrees).

In an embodiment, the unfolded state may include a partially unfolded state and a fully unfolded state. For example, the partially unfolded state (or partially open state) may be a state in which the folding angle is greater than or equal to about 20 degrees and less than about 150 degrees. The fully unfolded state (or fully open state) may be a state in which the folding angle is greater than or equal to about 150 degrees and less than or equal to about 180 degrees.

For example, in the case where the electronic device 200 switches from the fully unfolded state (or fully open state) or the partially unfolded state (or partially open state) to the folded state (or closed state) by a user's folding operation, a measurement value of the third sensor 250 may be less than a specified second reference value. The measured value of the third sensor 250 may be a value corresponding to the relative position and/or angle between the first portion and the second portion of the display 260 (e.g., a folding angle or distance between the first housing 312 and the second housing 314 in FIG. 3A)

In an embodiment, the processor 220 may monitor whether or not a signal indicating a change state switch is received from the third sensor 250. The signal may be a first interrupt signal indicating a switch from the folded state to the unfolded state, or a second interrupt signal indicating a switch from the unfolded state to the folded state.

According to an embodiment, the processor 220 may determine whether or not the display 260 switches from the folded state to the unfolded state, based on a measurement value of the third sensor 250 or an output signal (e.g., a first interrupt signal) according to the measurement value. For example, if the relative position and/or angle measured (or sensed) by the third sensor 250 increases to a specified first reference value (e.g., 10 degrees) or more, the third sensor 250 may transmit a first interrupt signal to the processor 220. The processor 220 may determine that the display 260 switched from the folded state to the unfolded state, based on the first interrupt signal.

According to an embodiment, the processor 220 may determine whether or not the display 260 switches from the unfolded state to the folded state using a measurement value of the third sensor 250 or an output signal (e.g., a second interrupt signal) according to the measurement value. For example, if the relative position and/or angle measured (or sensed) by the third sensor 250 decreases below a specified second reference value (e.g., about 20 degrees), the third sensor 250 may transmit a second interrupt signal to the processor 220. The processor 220 may determine that the display 260 switched from the unfolded state to the folded state, based on the second interrupt signal. While the folded state remains, at least a part of the first sensor 230 and the second sensor 240 may remain in an inactive (or off) state.

In an embodiment, the processor 220 may at least partially (or entirely) activate the first sensor 230 and the second sensor 240, based on the case where the display 260 switched from the folded state to the unfolded state. Activation of the first sensor 230 and the second sensor 240 may be intended to perform a change-degree measurement function. While the unfolded state is maintained, the first sensor 230 and the second sensor 240 may remain in an active (or on) state.

In an embodiment, the processor 220 may measure (or sense) the relative position and/or angle (or degree of change) between the first portion and the second portion in the display 260 using the activated first sensor 230 and second sensor 240.

According to an embodiment, in the folded state of the display 260, the first sensor 230 and the second sensor 240 may be partially or entirely inactivated. In the folded state, only a sensing operation required to monitor whether or not the change state switches may be performed. For example, only the first acceleration sensor 233 of the first sensor 230 and only the second acceleration sensor 243 of the second sensor 240 may be activated, and the first gyro sensor 235 of the first sensor 230 and the second gyro sensor 245 of the second sensor 240 may be deactivated.

In the unfolded state of the display 260, the first sensor 230 and the second sensor 240 may be entirely activated to measure (or sense) the degree of change in the display 260 (relative position and/or angle between the first portion and the second portion of the display 260). For example, all of the first acceleration sensor 233 and the first gyro sensor 235 of the first sensor 230, and the second acceleration sensor 243 and the second gyro sensor 245 of the second sensor 240 may be activated.

In an embodiment, the main processor 221 may determine a change state (e.g., an unfolded state or a folded state) of the display 260 (or the electronic device 200) through the third sensor 250. The main processor 221 may control a display operation of the display 260, based on the change state. For example, the main processor 221, based on the change state, may determine which portion of the display 260 (e.g., the main display 330 in FIG. 3A and the sub-display 350 in FIG. 3B) is to be turned on, where to display a screen, or how to divide and display a screen.

In the case where the main processor 221 is connected in series with the third sensor 250 and the sub-processor 225, the time taken to sense a change state switch (e.g., a switch from the folded state to the unfolded state or vice versa) may be delayed. The time delay may relatively increase a measurement error for the degree of change (e.g., a folding angle) during a folding or unfolding operation, compared to the case where it is connected in parallel.

In addition, if the third sensor 250 for monitoring the change state of the electronic device 200 is connected to only one of the main processor 221 and the sub-processor 225, the time taken to sense a change state switch (e.g., a switch from the folded state to the unfolded state or vice versa) may be delayed. The time delay may increase a measurement error for the degree of change (e.g., a folding angle) during a folding or unfolding operation, compared to the case where the third sensor 250 is connected to both the main processor 221 and the sub-processor 225.

According to an embodiment, the third sensor 250 may be connected in parallel with the main processor 221 and the sub-processor 225 for processing sensor data. Accordingly, the time taken to sense a change state switch may be relatively reduced compared to the case where it is connected in series, and the measurement error for the degree of change (e.g., a folding angle) may be improved, thereby increasing the measurement accuracy.

The sensor arrangement structure shown in FIG. 2 or the sensor control method described above is only exemplary, and the embodiments of the disclosure are not limited thereto.

For example, at least one of the first sensor 230 and the second sensor 240 may include only a gyro sensor, instead of including an acceleration sensor. The electronic device 200 may include a separate acceleration sensor that is not integrated with the first sensor 230 and the second sensor 240. As another example, at least a part of the first sensor 230 and the second sensor 240 (e.g., at least a part of the first sensor core 231 and the second sensor core 241) may be excluded, integrated with each other, or integrated with other elements (e.g., the sub-processor 225). As another example, interface connections (e.g., parallel and serial connections) between the processors 221 and 225 and the sensors 230, 240, and 250 may be implemented in different ways.

According to an embodiment, a first interrupt signal may be transmitted from the third sensor 250 to the processor 220 in response to an unfolding event. The unfolding event may be an event in which the relative position and/or angle between the first portion and the second portion of the display 260 increases due to a user's unfolding operation. The first interrupt signal may be a signal indicating that the display 260 switches from a folded state (e.g., a state in which the folding angle is less than about 10 degrees) to an unfolded state (e.g., a state in which the folding angle is greater than or equal to about 10 degrees).

According to an embodiment, the processor 220 may receive a first interrupt signal from the third sensor 250 in response to an unfolding event. The processor 220 may determine that the display 260 switched from the folded state to the unfolded state, based on the first interrupt signal received from the third sensor 250. The processor 220 may activate at least a part of the first sensor 230 and the second sensor 240, in response to reception of the first interrupt signal from the third sensor 250, in order to enable a change-degree measurement function.

According to an embodiment, a second interrupt signal may be transmitted from the third sensor 250 to the processor 220 in response to a folding event. The folding event may be an event in which the relative position and/or angle between the first portion and the second portion of the display 260 decreases due to a user's folding operation. The second interrupt signal may be a signal indicating that the display 260 switches from an unfolded state (e.g., a state in which the folding angle is equal to or greater than about 20 degrees) to a folded state (e.g., a state in which the folding angle is less than about 20 degrees).

According to an embodiment, the processor 220 may receive a second interrupt signal from the third sensor 250 in response to a folding event. The processor 220 may determine that the display 260 switched from the unfolded state to the folded state, based on the second interrupt signal received from the third sensor 250. The processor 220 may at least partially deactivate the first sensor 230 and the second sensor 240, in response to reception of the second interrupt signal from the third sensor 250, in order to disable the change-degree measurement function.

In an embodiment, the processor 220 may at least partially activate or deactivate the first sensor 230 and the second sensor 240, further based on an operation mode of the electronic device 200.

In an embodiment, the operation mode of the electronic device 200 may include an active mode and a low-power mode. For example, in the active mode of the electronic device 200, the main processor 221 and/or the sub-processor 225 in FIG. 2 may be driven (awake state) and the display 260 may be turned on. In the low-power mode of the electronic device 200, driving of the main processor 221 and/or sub-processor 225 may be stopped (sleep state), and the display 260 may be turned off.

According to an embodiment, when the electronic device 200 is in the unfolded state and when the operation mode of the electronic device 200 is the low-power mode, the first sensor 230 and the second sensor 240 may perform measurement of positions and/or angles, based on movement of the electronic device 200. Based on the case where the operation mode of the electronic device 200 switches from the low-power mode to the active mode, values measured by the first sensor 230 and the second sensor 240 during the low-power mode may be transmitted to the processor 220.

For example, if movement of the electronic device 200 is sensed in the unfolded state and in the low-power mode, the first sensor 230 and the second sensor 240 may measure and/or process the amount of change in position and/or angle. The processor 220 may receive data on the amount of change in position and/or angular measured by the first sensor 230 and the second sensor 240 in the low-power mode at the time at which the electronic device 200 switches to the active mode and calculate a relative position and/or angle (e.g., a folding angle) between the first portion and the second portion of the display 260, based on the received data.

According to an embodiment, the processor 220 may display, through the display 260, a user interface based on the relative position and/or angle (or the degree of change) measured using the activated first sensor 230 and second sensor 240.

In an embodiment, the power module 280 may manage power supplied to or used in the electronic device 200. The power module 280 may adjust a power consumption level to correspond to the operation mode of the electronic device 200 under the control of the processor 220. For example, the power consumption level may be adjusted to a normal level higher than a low power level in the active mode. The power consumption level may be adjusted to a low power level, which is lower than the normal level in the low-power mode.

FIGS. 3A, 3B, 4, 5A, 5B, and 5C are diagrams illustrating mechanical states of an electronic device according to an embodiment.

According to an embodiment, the electronic device 200 may have mechanical structures as shown in FIGS. 3A, 3B, 4, 5A, 5B, and 5C. The mechanical state of the electronic device 200 may vary as shown in FIGS. 3A, 3B, 4, 5A, 5B, and 5C. For example, the change state of the electronic device 200 may include a fully unfolded state, one or more partially unfolded states, and a folded state.

Figure 3A:
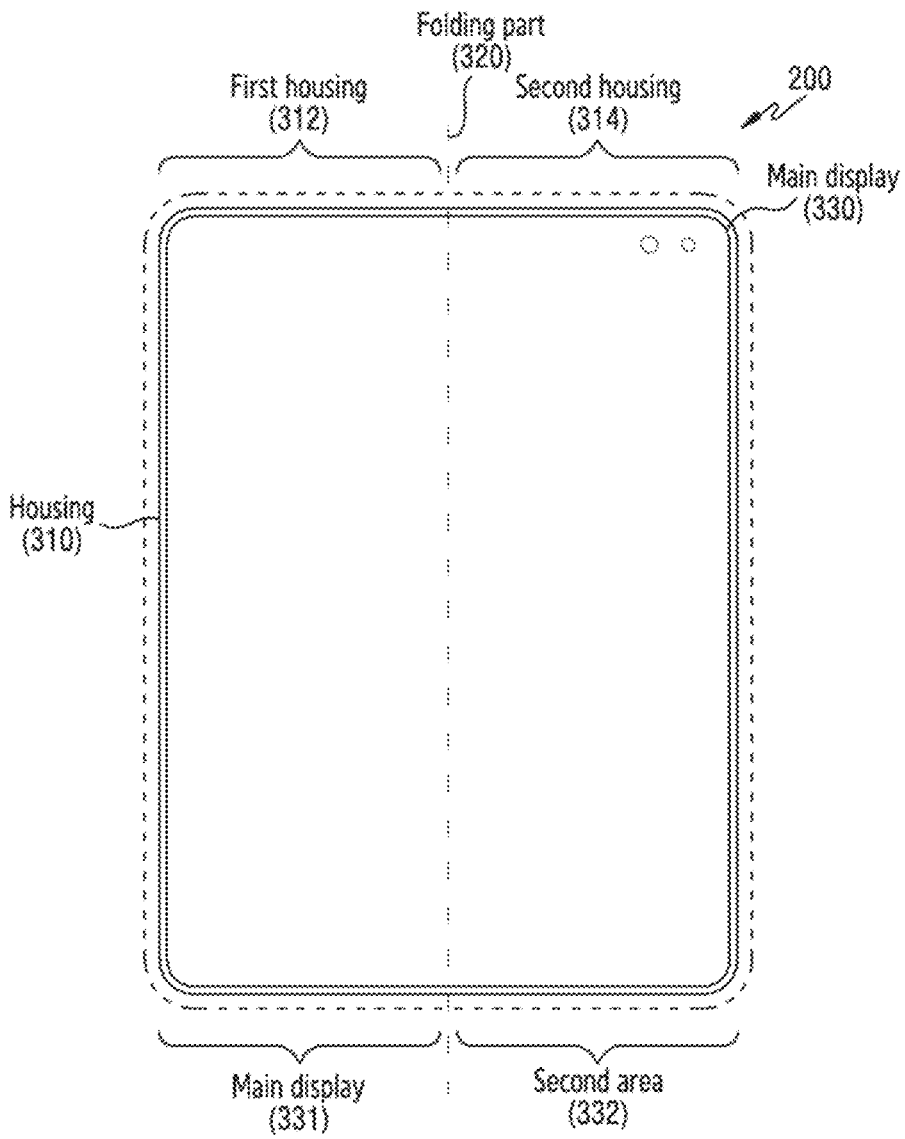
FIG. 3A is a front view illustrating a fully unfolded state of an electronic device according to an embodiment.
Figure 3B:
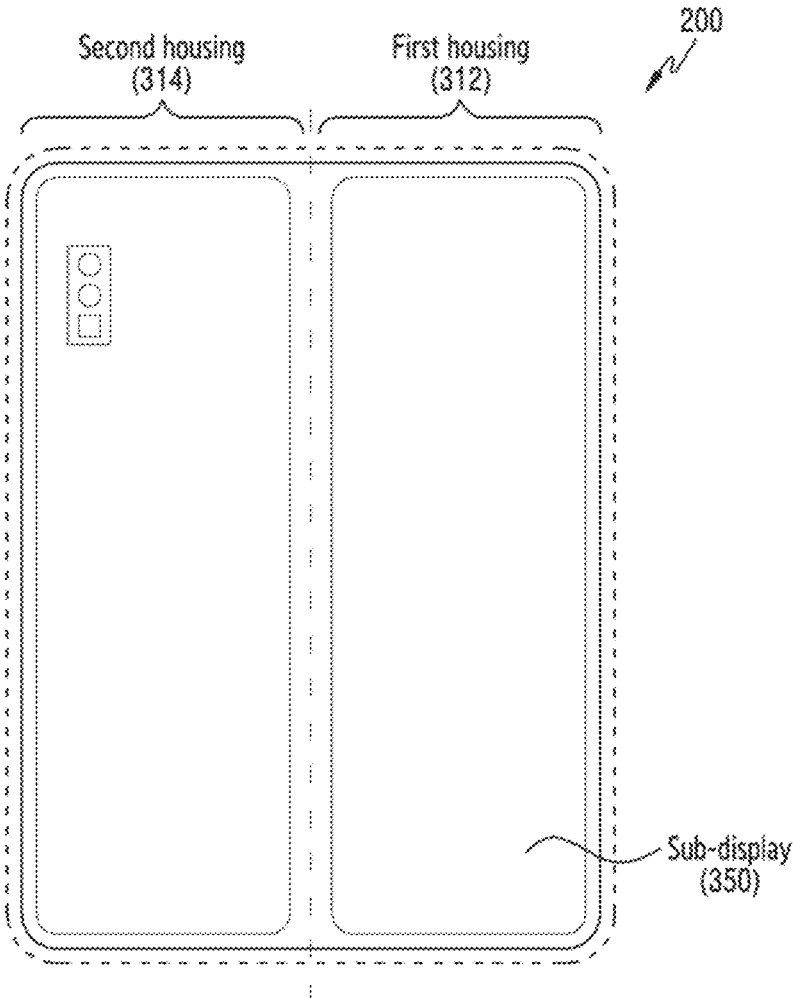
FIG. 3B is a rear view illustrating a fully unfolded state of an electronic device according to an embodiment.

FIG. 3A is a front view illustrating an unfolded state (or open state) of an electronic device 200 according to an embodiment, and FIG. 3B is a rear view illustrating an unfolded state (or open state) of an electronic device 200 according to an embodiment. The unfolded state in FIGS. 3A and 3B may correspond to a fully unfolded state or a fully open state.

Figure 4:
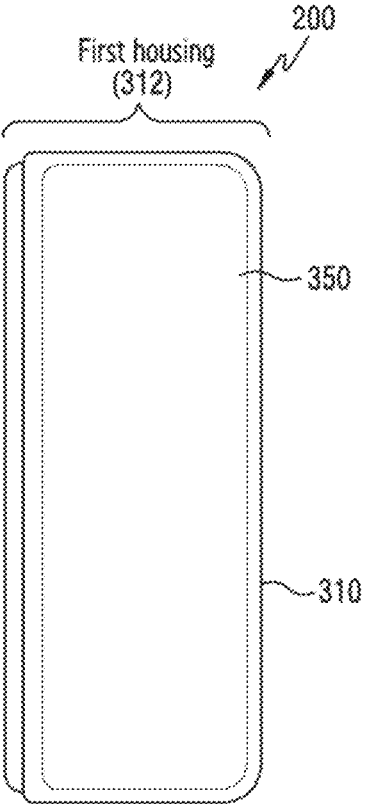
FIG. 4 is a diagram illustrating a folded state of an electronic device according to an embodiment.

FIG. 4 is a diagram illustrating a folded state (or closed state) of an electronic device 200 according to an embodiment.

Referring to FIGS. 3A and 3B, the electronic device 200 according to an embodiment may include a housing 310, a folding part 320, a main display 330, and/or a sub-display 350.

According to an embodiment, the housing 310 may be a foldable housing (or flexible housing). The housing 310 may include a first housing 312 and a second housing 314. The first housing 312 may include a first surface (or first front surface) and a third surface (or first rear surface) facing in the opposite direction of the first surface. The second housing 314 may include a second surface (or second front surface) and a fourth surface (or second rear surface) facing in the opposite direction of the second surface.

According to an embodiment, the first housing 312 and the second housing 314 may be disposed on both sides of the folding part 320 and connected by the folding part 320. For example, the folding part 320 may be coupled to the side of the first housing 312 and the side of the second housing 314 facing the side of the first housing 312 such that the first housing 312 and the second housing 314 may be connected to be pivotably (or rotatably) or to be folded. According to an embodiment, the first housing 312 may be connected to the second housing 314 through the folding part 320 so as to rotate about the folding part 320. In addition, the second housing 314 may be connected to the first housing 312 through the folding part 320 so as to rotate about the folding part 320. The first housing 312 and the second housing 314 may be folded by rotating about the folding part 320 so as to face each other.

According to an embodiment, the main display 330 may be disposed on the first housing 312 and the second housing 314 across the foldable portion 320. The main display 330 may be installed to be at least partially supported by the first housing 312 and the second housing 314.

In an embodiment, the main display 330 may be disposed on the first surface of the first housing 312 and the second surface of the second housing 314 across the folding part 320. The area of the main display 330 may be divided into different areas based on the folding part 320. For example, the area of the main display 330 may be divided into a first area 331 and a second area 332. The first area 331 may be an area corresponding to the first housing 312. The second area 332 may be an area corresponding to the second housing 314.

According to an embodiment, the sub-display 350 may be disposed in a space formed by the first housing 312. At least a portion of the sub-display 350 may be visually exposed through a partial area of the third surface (or first rear surface) of the first housing 312. However, this is only an example, and the embodiments of the disclosure are not limited thereto. For example, the sub-display 350 may be disposed in a space formed by the second housing 314, and at least a portion thereof may be visually exposed through a partial area of the fourth surface (or second rear surface) of the second housing 314.

According to an embodiment, although not shown, the folded part 320 may include a hinge and a hinge cover, and the hinge may be covered by the hinge cover.

According to an embodiment, the main display 330 may be configured as an integral touch screen by being combined with a touch sensor (not shown) capable of detecting a touch input. In the case where the main display 330 is configured as a touch screen, the touch sensor may be disposed on the main display 330 or below the main display 330.

The aforementioned configuration of the electronic device 200 is exemplary, and the scope of the embodiments of the disclosure is not limited thereto. For example, the electronic device 200 may include at least one component in addition to the above-described configuration. At least one component may include, as at least some of the configurations described above with reference to FIG. 1 or FIG. 2, at least one camera, at least one sensor, at least one microphone, at least one speaker, and the like, and the at least one component may be disposed in a space formed by the first housing 312 or the second housing 314.

The electronic device 200 according to an embodiment may enter a fully unfolded state (or fully open state) as shown in FIGS. 3A and 3B by the folding part 320.

According to an embodiment, the fully unfolded state (or fully open state) may be a state in which the first surface of the first housing 312 faces in a first direction (e.g., the front surface of the electronic device 200 or the upper direction of the first housing 312) and in which the second surface of the second housing 314 faces a second direction substantially the same as the first direction. For example, when the electronic device 200 is in a fully unfolded state, the angle between the first surface of the first housing 312 and the second surface of the second housing 314 may fall within a predetermined first angle range. The predetermined first angle range may be greater than or equal to about 150 degrees and less than or equal to about 180 degrees. In the fully unfolded state of the electronic device 200, the main display 330 may be exposed to the user's field of view facing the front surface of the electronic device 200, and the sub-display 350 may not be exposed.

In addition, the electronic device 200 may enter a folded state (or closed state) as shown in FIG. 4 by the folding part 320.

According to an embodiment, the folded state (or closed state) may be a state in which the first housing 312 and the second housing 314 substantially overlap or are superimposed with each other.

The substantially overlapping or superimposed state may be a state in which an angle between the first surface of the first housing 312 and the second surface of the second housing 314 falls within a predetermined second angle range. The predetermined second angle range may be greater than or equal to about 0 degrees and less than about 10 degrees. For example, as shown in FIG. 4, the state in which the first surface (e.g., the first front surface) of the first housing 312 and the second surface (e.g., the second front surface) of the second housing 314 face each other may be a closed state. In the folded state (or closed state) of the electronic device 200, the sub-display 350 may be exposed to a user's field of view facing the front surface of the electronic device 200, and the main display 330 may not be exposed.

Figure 5A:
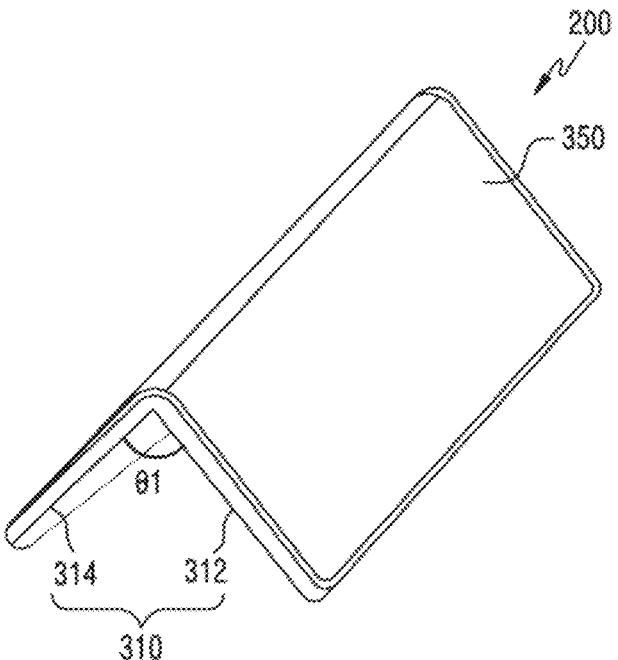
FIGS. 5A, 5B, and 5C are diagrams illustrating partially unfolded states of an electronic device according to an embodiment.
Figure 5B:
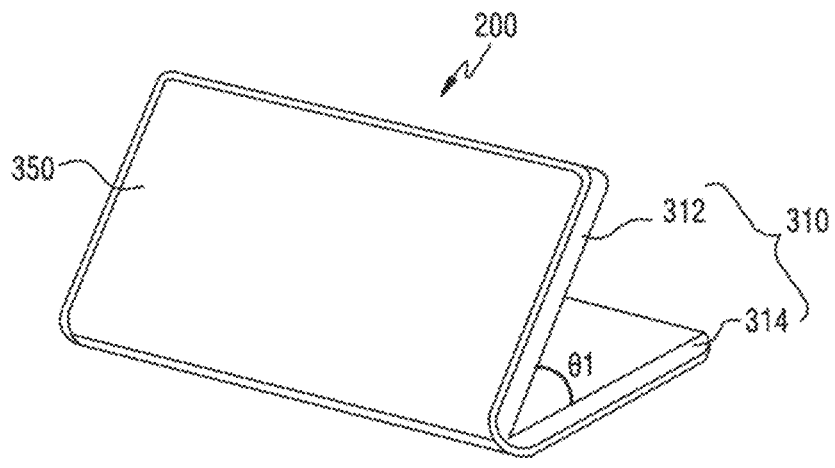
Figure 5C:
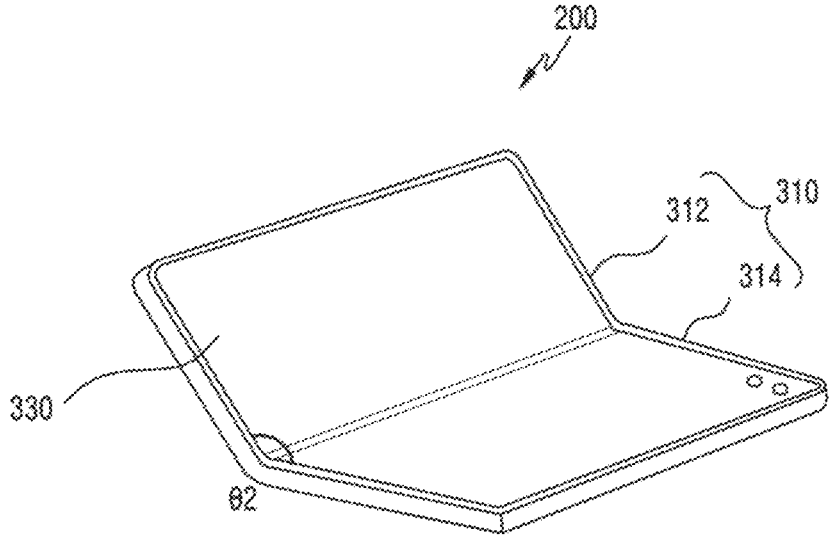

FIGS. 5A, 5B, and 5C are diagrams illustrating partially unfolded states of an electronic device according to an embodiment. The electronic device 200 may enter a partially unfolded state (or partially open state) as shown in FIGS. 5A, 5B, and 5C by the folding part 320.

According to an embodiment, the partially unfolded state may correspond to an intermediate state between the fully unfolded state (or fully open state) and the folded state (or closed state) described above. For example, when the electronic device 200 is in the partially unfolded state, as shown in FIGS. 5A, 5B, and 5C, angles θ1 and θ2 between the first surface of the first housing 312 and the second surface of the second housing 314 may fall within a predetermined third angle range. The predetermined third angle range may be greater than or equal to about 10 degrees and less than about 150 degrees.

As shown in FIGS. 5A, 5B, and 5C, a display method by the main display 330 and/or the sub-display 350 may vary depending on the folding angles θ1 and θ2 of the electronic device 200.

FIG. 5A illustrates a partially unfolded state of the electronic device 200 placed on a floor (or horizontal plane) in a tent mode. An angle θ1 between the first surface of the first housing 312 and the second surface of the second housing 314 may be greater than or equal to about 10 degrees and less than about 90 degrees. In the partially unfolded state of the electronic device 200 shown in FIG. 5A, the sub-display 350 may be exposed to a user's field of view facing the front surface of the electronic device 200, and the main display 330 may not be exposed.

FIG. 5B illustrates a partially unfolded state of the electronic device 200 placed on the floor in a book mode. An angle θ1 between the first surface of the first housing 312 and the second surface of the second housing 314 may be greater than or equal to about 10 degrees and less than about 90 degrees. In the partially unfolded state of the electronic device 200 shown in FIG. 5B, the sub-display 350 may be exposed to a user's field of view facing the front surface of the electronic device 200, and the main display 330 may not be exposed.

FIG. 5C shows a partially unfolded state of the electronic device 200 placed on the floor in a normal mode. An angle θ2 between the first surface of the first housing 312 and the second surface of the second housing 314 may be greater than or equal to about 90 degrees and less than about 150 degrees. In the partially unfolded state of the electronic device 200 shown in FIG. 5C, the main display 330 may be exposed to a user's field of view facing the front surface of the electronic device 200, and the sub-display 350 may not be exposed.

The ranges of angles used to determine the aforementioned unfolded state (or fully open state), partially unfolded state, and folded state (or closed state), or whether or not the state switches are merely exemplary, and various embodiments of the disclosure are not limited thereto. For example, the ranges of angles used to determine the unfolded state, partially unfolded state, and folded state, or whether or not the state switches may be configured and/or changed by a designer and/or a user.

Although the in-folding electronic device is shown in the embodiments of FIGS. 3A, 3B, 4, 5A, 5B, and 5C, the illustrated structure is merely intended to help understanding, and the scope of the embodiments is not limited to a specific structure. Various embodiments may be implemented to modify, change, apply, or extend the illustrated structure within a range that includes a flexible display or enables change of the mechanical state of an electronic device. For example, an electronic device according to an embodiment may be any one of an out-folding type electronic device, a bidirectional folding type electronic device, and a multi-foldable type electronic device.

Figure 6:
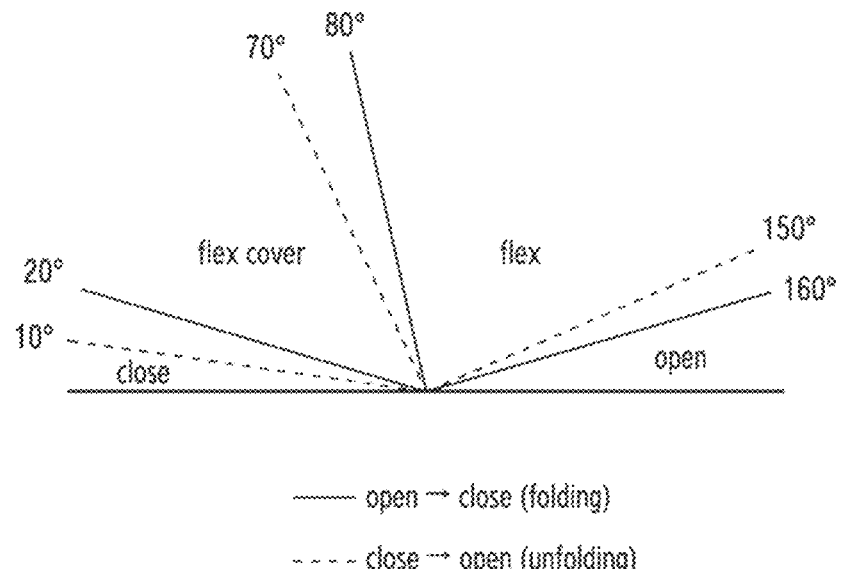
FIG. 6 is a diagram illustrating folding sections according to a change state of an electronic device according to an embodiment.

FIG. 6 is a diagram illustrating folding sections according to a change state of an electronic device according to an embodiment.

According to an embodiment, the electronic device 200 may perform various operations (e.g., a display operation and a control operation), based on the degree of change (e.g., a folding angle) of the display 260.

In an embodiment, the electronic device 200 may control a display method through the display 260 (e.g., the main display 330 in FIG. 3A and the sub-display 350 in FIG. 3B) to be different depending on a folding angle of the display 260. For example, if a folding angle remains within about 70 degrees in the unfolded state in which the sub-display 350 on the first housing 312 is turned on, the electronic device 200 may maintain the on-state of the sub-display 350 and the screen display through the sub-display 350. If the electronic device 200 is further unfolded such that the folding angle becomes greater than or equal to about 80 degrees, a target for displaying a screen may be changed to the main display 330. If the folding angle remains within a range of about 80 degrees to about 160 degrees, the electronic device 200 may divide the screen of the main display 330 into two halves and display information desired by the user on each screen.

In the case of a flexible type electronic device, unnecessary switching (e.g., repetition of on/off of the display or too frequent switching of operation modes) may occur or the usability may deteriorate in a boundary section for a change state switch (e.g., sensations in which the folding angle is about 10 degrees to about 20 degrees, about 70 degrees to about 80 degrees, or about 150 degrees to about 160 degrees) due to a hysteresis characteristic in which the sensor is affected by the previous state during a change operation (e.g., a folding or unfolding operation).

For example, if the change state is determined based on one folding angle (e.g., about 20 degrees) regardless of the situation of the electronic device, the accuracy of determination may be lowered.

According to an embodiment, the electronic device 200 may variably configure reference values (e.g., folding angle values) for determining whether or not the change state switches in order to improve unnecessary switching or deterioration in usability.

Referring to FIG. 6, the folding section of the electronic device 200 according to an embodiment may include a first section (close), a second section (flex cover), a third section (flex), and a fourth section (open).

For example, if a folding angle of the electronic device 200 gradually increases due to a user's unfolding operation (close→open, indicated by a dotted line), the folding section may change in sequence of the first section (close, about 0 degrees to about 10 degrees), the second section (flex cover, about 10 degrees to about 70 degrees), the third section (flex, about 70 degrees to about 150 degrees), and the fourth section (open, about 150 degrees to about 180 degrees).

If the folding angle of the electronic device 200 gradually decreases due to a user's folding operation (open→close, indicated by a solid line), the folding section may change in sequence of the fourth section (open, about 180 degrees to about 160 degrees), the third section (flex, about 160 degrees to about 80 degrees), the second section (flex cover, about 80 degrees to about 20 degrees), and the first section (close, about 20 degrees to about 0 degrees).

According to an embodiment, if the folding angle gradually decreases during folding and falls within a first section (close) (equal to or greater than about 0 degrees and less than about 20 degrees), it may be determined that the electronic device 200 switched from the unfolded state to the folded state. If the folding angle gradually increases during unfolding and falls outside of the first section (close) (equal to or greater than about 0 degrees and less than about 10 degrees), the electronic device 200 may determine that the electronic device 200 switched from the folded state to the unfolded state.

In an embodiment, if the folding angle increases to a first reference value (e.g., 10 degrees) or more by an unfolding operation in the folded state and in the low-power mode, the electronic device 200 may determine that the electronic device switched to the unfolded state, thereby switching to the active mode. If the folding angle decreases below a second reference value (e.g., 20 degrees) by a folding operation in the unfolded state and in the active mode, the electronic device 200 may determine that the electronic device 200 switched to the folded state, thereby switching to the low-power mode.

According to this, it is possible to prevent unnecessary switching or deterioration in usability by determining the time at which the change state of the electronic device switches. In addition, it is possible to improve usability by measuring the degree of change of the electronic device in the unfolded state and performing various operations (e.g., turning on/off the display, adjusting a power level, or switching between the low-power mode and the active mode), based on the measurement result.

In an embodiment, the electronic device 200 may configure a first reference value (e.g., 10 degrees) for determining whether the electronic device 200 switches from the folded state to the unfolded state and a second reference value (e.g., 20 degrees) for determining whether the electronic device 200 switches from the unfolded state to the folded state to be different from each other.

The first reference value may be a reference value for enabling the change-degree measurement function. The second reference value may be a reference value for disabling the change-degree measurement function. The first reference value may be configured to be less than the second reference value. If the first reference value is configured to be less than the second reference value, the change-degree measurement function may be enabled relatively quickly during a user's unfolding operation, thereby improving usability. If the second reference value is configured to be greater than the first reference value, the change-degree measurement function may be disabled relatively quickly during a user's folding operation, thereby reducing power consumption.

However, this control method is only an example to help understanding, and the scope of the embodiment is not limited thereto. For example, even if the electronic device switches from the unfolded state to the folded state, the electronic device may switch to the low-power mode if there is no user input after waiting for a user input for a predetermined time, instead of immediately switching to the low-power mode. As another example, even if the electronic device switches from the folded state to the unfolded state, the electronic device may switch to the active mode if a user input is sensed, instead of immediately switching to the active mode.

Figure 7:
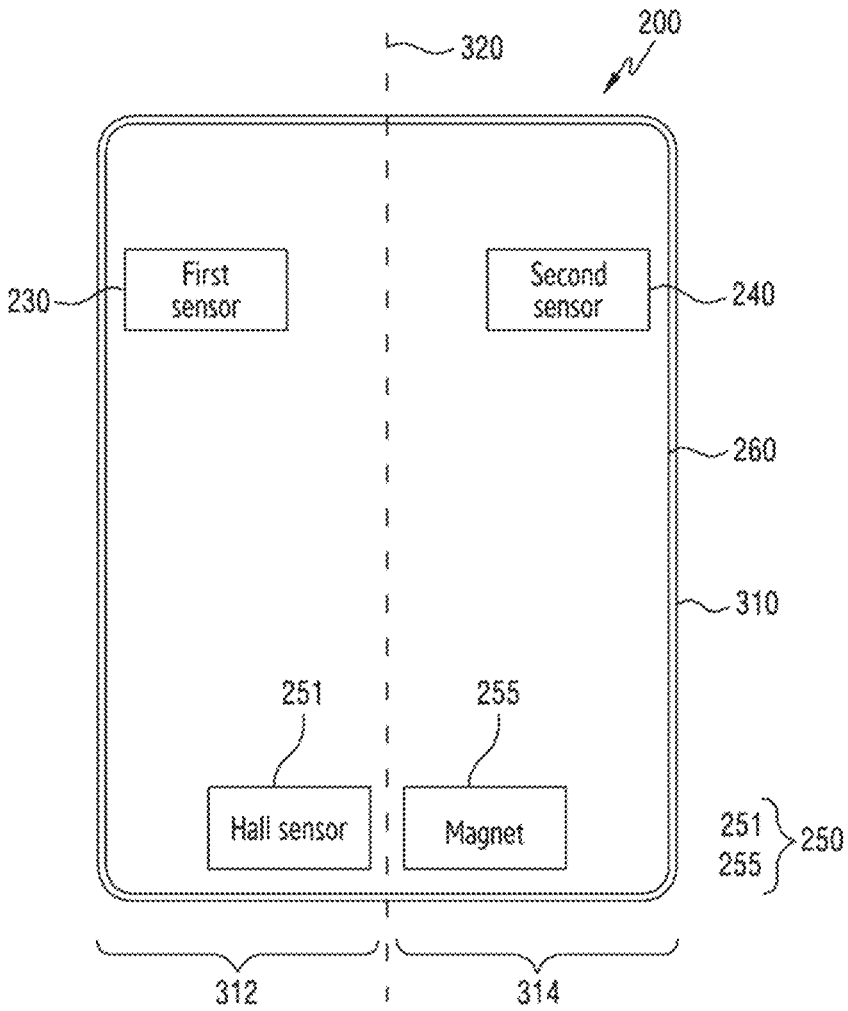
FIG. 7 is a diagram illustrating a sensor arrangement structure of an electronic device according to an embodiment.

FIG. 7 is a diagram illustrating a sensor arrangement structure of an electronic device according to an embodiment.

Referring to FIG. 7, the electronic device 200 according to an embodiment may include a housing 310, a display 260, a first sensor 230 and a second sensor 240 disposed in the housing 310, and a third sensor 250 disposed in the housing 310.

In an embodiment, the display 260 may be a flexible display including a first portion (e.g., a portion of the first housing 312) and a second portion (e.g., a portion of the second housing 314). The first portion and the second portion of the display 260 may be configured to be folded or unfolded around a folding part 320 (e.g., a folding shaft). As a folding or unfolding operation is performed, a change state and/or a degree of change (e.g., a folding angle) of the electronic device 200 may vary.

According to an embodiment, two different types of sensors may be used to sense the change state and/or degree of change of the electronic device 200.

In an embodiment, the first sensor 230 and the second sensor 240 may be substantially the same type of sensor. For example, each of the first sensor 230 and the second sensor 240 may be a gyro sensor or a 6-axis acceleration gyro sensor including a gyro sensor. The first sensor 230 and the second sensor 240 may be intended to measure the degree of change of the electronic device 200 (or the relative position and/or angle between the first and second portions of the display 260).

In an embodiment, the third sensor 250 may be a different type of sensor from the first sensor 230 and the second sensor 240. The third sensor 250 may sense whether or not the electronic device 200 switches the change state thereof. The third sensor 250 may be used to monitor the change state of the electronic device 200. For example, the third sensor 250 may be intended to determine whether the change state of the electronic device 200 corresponds to the folded state or the unfolded state, whether the electronic device 200 switches from the folded state to the unfolded state, or whether the electronic device 200 switches from the unfolded state to the folded state. At least a part of the first sensor 230 and the second sensor 240 may be activated or deactivated based on the monitoring.

In an embodiment, the electronic device 200 may monitor whether or not the change state of the display 260 switches from the folded state to the unfolded state using the third sensor 250. If the display 260 switches to the unfolded state (e.g., the case where the folding angle of the display 260 is greater than or equal to about 10 degrees) as a result of the monitoring, the electronic device 200 may activate the first sensor 230 and the second sensor 240 in order to measure the degree of change of the display 260 in real time.

According to an embodiment, in the folded state of the display 260, a first gyro sensor 235 and a second gyro sensor 245, which are parts of the first sensor 230 and the second sensor 240, may be deactivated. In the unfolded state of the display 260, the first gyro sensor 235 and the second gyro sensor 245 may be activated to measure the degree of change. In the unfolded state of the display 260, the first sensor 230 and the second sensor 240 may be entirely activated to measure the degree of change (e.g., a folding angle). For example, all of a first acceleration sensor 233 and a first gyro sensor 235 in the first sensor 230, and a second acceleration sensor 243 and a second gyro sensor 245 in the second sensor 240 may be activated.

In an embodiment, each of the first sensor 230 and the second sensor 250 may be a 6-axis gyro acceleration sensor including an acceleration sensor and a gyro sensor.

In an embodiment, the third sensor 250 may include a Hall sensor (e.g., the Hall sensor 251 in FIG. 7) or a proximity sensor (not shown).

For example, the third sensor 250 may include a Hall sensor 251 and a magnet 255 as shown. The Hall sensor 251 may include a transmitter (not shown) for generating a magnetic field in a specified frequency and a receiver (not shown) for receiving the magnetic field generated by the transmitter. The Hall sensor 251 may be disposed at a position corresponding to the first portion (e.g., the first housing 312) of the display 260. The magnet 255 may be disposed at a position corresponding to the second portion (e.g., the second housing 314) of the display 260. For example, the Hall sensor 251 may measure a change in the magnetic force generated by movement of the magnet 255 during a folding or unfolding operation and, based on previously stored table information on a change in magnetic force for each folding angle, calculate the measurement data into a folding angle.

In an embodiment, the third sensor 250 (e.g., the Hall sensor 251) may be disposed in a space where the first housing 312 and the second housing 314 may come into contact and obtain data related to folding or unfolding of the first housing 312 and the second housing 314.

In an embodiment, the third sensor 250 (e.g., a proximity sensor) may be disposed inside the first housing 312 or the second housing 314. For example, the proximity sensor may be disposed at an end corresponding to a first direction of the first housing 312 (e.g., an upward direction of the first housing 312) or at an end corresponding to a second direction of the second housing 314 (e.g., an upper direction of the second housing 314), which is substantially the same as the first direction. For example, the proximity sensor may be exposed to the outside of the electronic device 200 through an opening formed on a first surface (e.g., a first front surface) of the first housing 312 or a second surface (e.g., a second front surface) of the second housing 314 and obtain data related to proximity of the first housing 312 and the second housing 314.

In an embodiment, each of the first sensor 230 and the second sensor 240 may continuously (cumulatively) summating the amount of change in position and/or angle using an internal gyro sensor, thereby measuring a final folding angle. Measuring the amount of change in position and/or angular variation and the folding angle may be repeatedly performed by the first sensor 230 and the second sensor 240. For example, the first sensor 230 and the second sensor 240 may measure the folding angle in real time or measure the folding angle at a measurement time interval shorter than the third sensor 250 using a higher current consumption than the third sensor 250

In an embodiment, the electronic device 200 may perform a calculation process on the measurement data of the first sensor 230 and the second sensor 240 to calculate a folding angle between the first portion and the second portion of the display 260. The first sensor 230 or the second sensor 240 may measure a final angle by correcting errors in the gyro sensor using an acceleration sensor that measures an angle (absolute angle) in the direction of gravity (or vertical direction). For example, if the electronic device 200 is tilted at a certain angle (e.g., about 70 degrees) or less with respect to the floor (or horizontal plane), the measurement accuracy may be improved through error correction using an acceleration sensor.

According to an embodiment, when the electronic device 200 is in the folded state (e.g., the state in which the folding angle is less than about 10 degrees), the first sensor 230 and the second sensor 240 may be entirely or partially inactivated (or turned off) so that a change-degree measurement function may not be performed. In the folded state, the third sensor 250 may sense whether or not the change state switches.

In an embodiment, the electronic device 200 may perform a change state monitoring function using the third sensor 250. The electronic device 200 may monitor whether or not the electronic device 200 switches from the folded state to the unfolded state or whether or not the electronic device 200 switches from the unfolded state to the folded state through the third sensor 250. The electronic device 200 may determine whether the change state of the electronic device 200 corresponds to the folded state or the unfolded state through the third sensor 250. For example, the electronic device 200 may determine the time at which the user unfolds the electronic device 200 in the folded state by an unfolding operation (e.g., the time at which the folding angle increases to about 10 degrees or more) and/or the time at which the user fully folds the electronic device 200 in the unfolded state by a folding operation (e.g., the time at who the folding angle decreases below about 20 degrees) using the third sensor 250. The third sensor 250 may generate (or output) an interrupt signal at that time to inform the processor 220 that the change state of the electronic device 200 switches from the folded state to the unfolded state or from the unfolded state to the folded state.

According to an embodiment, the electronic device 200 may determine the time at which the electronic device 200 switches from the folded state (e.g., the state where the folding angle is less than about 10 degrees) to the unfolded state (e.g., the state where the folding angle is about 10 degrees or more) by a change state monitoring function using the third sensor 250. The electronic device 200 may activate entirety of the first sensor 230 and the second sensor 240 at the above time and measure the degree of change (e.g., a folding angle) of the display 260 using the activated first sensor 230 and the second sensor 240, thereby improving the situation in which the electronic device 200 is actually used.

According to an embodiment, the electronic device 200 may determine the time at which the electronic device 200 switches from the unfolded state (e.g., the state where the folding angle is about 20 degrees or more) to the folded state (e.g., the state where the folding angle is less than about 20 degrees) by a change state monitoring function using the third sensor 250. The electronic device 200 may reduce power consumption when the electronic device 200 is not used by deactivating at least a part of the first sensor 230 and the second sensor 240 at the above time.

The above-described sensor arrangement structure and/or sensor control method is an example for helping understanding of various embodiments, and various embodiments of the disclosure will not be limited thereto. For example, the position where at least one sensor is disposed, the number or types of sensors, and a control method for each sensor may be configured and/or changed by a designer and/or a user.

Figure 8:
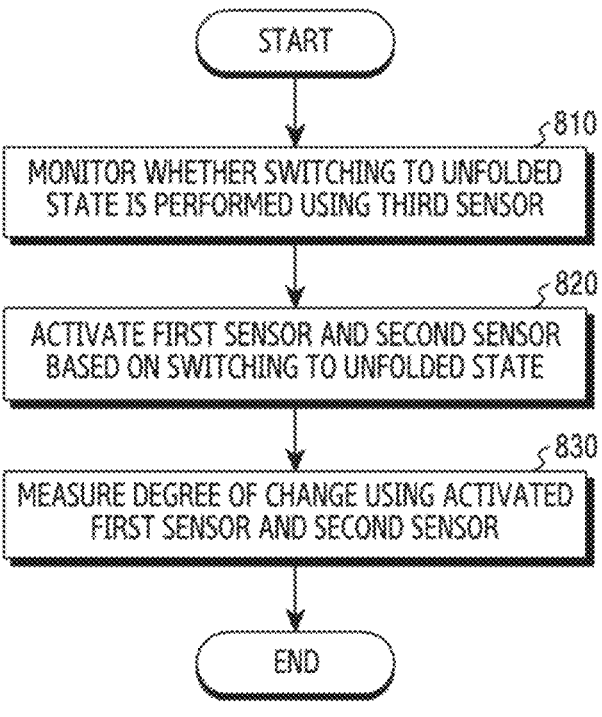
FIG. 8 is a flowchart illustrating an operation method of an electronic device according to an embodiment.

FIG. 8 is a flowchart illustrating an operation method of an electronic device according to an embodiment.

In the following embodiment, respective operations may be performed sequentially, but not necessarily sequentially. For example, the sequence of the respective operations may vary, or at least two operations may be performed in parallel. Alternatively, at least one of the illustrated operations may be omitted, the sequence of some operations may vary, or another operation may be added thereto.

According to an embodiment, the electronic device 200 may include a first sensor 230, a second sensor 240, and a third sensor 250. The third sensor 250 may be a sensor for sensing whether or not the change state of the display 260 switches. For example, the change state of the display 260 may include a folded state and an unfolded state. The first sensor 230 and the second sensor 240 may be sensors for measuring the degree of change. For example, the degree of change may correspond to a folding angle.

In the following embodiment, although it is assumed that the first sensor 230 and the second sensor 240 for measuring the degree of change are 6-axis gyro acceleration sensors, the scope of the embodiment is not limited thereto.

Referring to FIG. 8, an operation method of an electronic device 200 according to an embodiment may include operations 810, 820, and 830.

According to an embodiment, in operation 810, the electronic device 200 or the display 260 of the electronic device 200 may be in a folded state. In the folded state, the first sensor 230 (6-axis gyro acceleration sensor) and the second sensor 240 (6-axis gyro acceleration sensor) may be partially or entirely inactivated. Each of the first sensor 230 and the second sensor 240 may be at least partially inactivated.

According to an embodiment, a change-degree measurement function may be unnecessary in the folded state of the display 260. Accordingly, the electronic device 200 (e.g., the processor 220 in FIG. 2) may deactivate (or turn off) at least a part of the first sensor 230 and the second sensor 240 for measuring the degree of change in the folded state, thereby reducing power consumption.

According to an embodiment, in the folded state, only parts of the first sensor 230 and the second sensor 240 may be deactivated, and the remaining parts thereof may remain in the active state. For example, the first gyro sensor 235 and the second gyro sensor 245 having a relatively large current consumption, among the internal elements of the first sensor 230 and the second sensor 240, may be deactivated (or turned off). The first acceleration sensor 233 in the first sensor 230 and the second acceleration sensor 243 in the second sensor 240 may remain in the active (or on) state so as to be used in monitoring whether or not the electronic device 200 moves.

In an embodiment, operation 810 may be a change state monitoring operation.

According to an embodiment, in the folded state in operation 810, the electronic device 200 (e.g., the processor 220 in FIG. 2) may monitor whether or not the display 260 (or the electronic device 200) switches from the folded state to the unfolded state using the third sensor 250 (e.g., a Hall sensor or a proximity sensor).

In an embodiment, the third sensor 250 may measure the relative positions and/or angles of the first portion and the second portion of the display 260 and sense whether or not the change state of the display 260 switches based on the measurement data.

In an embodiment, the electronic device 200 (e.g., the processor 220) may monitor whether or not a signal indicating a change state switch is received from the third sensor 250. The signal may be an interrupt signal indicating switching from the folded state to the unfolded state. For example, if the position and/or angle measured by the third sensor 250 increases to a specified first reference value (e.g., 10 degrees) or more, an interrupt signal may be output.

Operation 820 may be a sensor activating operation for enabling a change-degree measurement function.

According to an embodiment, in operation 820, the electronic device 200 may at least partially (or entirely) activate the first sensor 230 and the second sensor 240, based on the case where the display 260 switches from the folded state to the unfolded state.

According to an embodiment, a first interrupt signal may be transmitted from the third sensor 250 to the processor 220 in response to an unfolding event. The unfolding event may be an event in which the relative position and/or angle between the first portion and the second portion of the display 260 increases due to a user's unfolding operation. The first interrupt signal may be a signal indicating that the display 260 switches from the folded state (e.g., the state in which the folding angle is less than about 10 degrees) to the unfolded state (e.g., the state in which the folding angle is greater than or equal to about 10 degrees). The third sensor 250 may output a first interrupt signal in response to the unfolding event. If the first interrupt signal is received from the third sensor 250, the processor 220 determine that the display 260 switched from the folded state to the unfolded state. The processor 220 may activate at least a part of the first sensor 230 and the second sensor 240, in response to the reception of the first interrupt signal from the third sensor 250, in order to enable a change-degree measurement function.

For example, if the display 260 switches from the folded state to the unfolded state, the electronic device 200 (e.g., the processor 220) may activate the first gyro sensor 235 and the second gyro sensor 245, which were deactivated in the folded state, in order to enable the change-degree measurement function. Accordingly, in the unfolded state, the first acceleration sensor 233 and the first gyro sensor 235 in the first sensor 230, and the second acceleration sensor 243 and the second gyro sensor 245 in the second sensor 240 may all be activated.

Operation 830 may be a change-degree measurement operation.

According to an embodiment, in operation 830, the electronic device 200 (e.g., the processor 220) may measure (or sense) the relative positions and/or angles of the first portion and second portion in the display 260 using the activated first sensor 230 and second sensor 240.

According to an embodiment, the electronic device 200 (e.g., the processor 220) may at least partially deactivate the first sensor 230 and the second sensor 240, based on the case where the display 260 switches from the unfolded state to the folded state.

According to an embodiment, a second interrupt signal may be transmitted from the third sensor 250 to the processor 220 in response to a folding event. The folding event may be an event in which the relative position and/or angle between the first portion and the second portion of the display 260 decreases due to a user's folding operation. The second interrupt signal may be a signal indicating that the display 260 switches from the unfolded state (e.g., the state in which the folding angle is about 20 degrees or more) to the folded state (e.g., the state in which the folding angle is less than about 20 degrees). The third sensor 250 may output a second interrupt signal in response to the folding event. If the second interrupt signal is received from the third sensor 250, the processor 220 may determine that the display 260 switched from the unfolded state to the folded state. The processor 220 may at least partially deactivate the first sensor 230 and the second sensor 240, in response to reception of the second interrupt signal from the third sensor 250, in order to disable the change-degree measurement function.

For example, if the display 260 switches from the unfolded state to the folded state, the electronic device 200 (e.g., the processor 220) may deactivate the first gyro sensor 235 and the second gyro sensor 245, which are parts of first sensor 230 and the second sensor 240, in order to disable the change-degree measurement function.

In an embodiment, the electronic device 200 (e.g., the processor 220) may activate or deactivate at least a part of the first sensor 230 and the second sensor 240, further based on the operation mode of the electronic device 200. The operation mode may be any one of an active mode and a low-power mode.

According to an embodiment, the electronic device 200 (e.g., the processor 220) may control whether or not activate the first sensor 230 and the second sensor 240, further based on the operation mode of the electronic device 200, while the change state of the display 260 remains in one state (e.g., the unfolded state).

According to an embodiment, if the electronic device 200 switches to the low-power mode in the unfolded state (e.g., if there is no user input for a predetermined time or if a battery level decreases below a specified level), the electronic device 200 (e.g., the processor 220) may deactivate the first portion (e.g., the first gyro sensor 235 and the second gyro sensor 245) of the first sensor 230 and the second sensor 240 and then enter a sleep state in order to reduce power consumption. In the low-power mode, the second portion (e.g., the first acceleration sensor 233 and the second acceleration sensor 243) of the first sensor 230 and the second sensor 240 may remain in the active state to sense whether or not the electronic device 200 moves.

According to an embodiment, in response to sensing movement of the electronic device 200 through the activated second portion (e.g., the first acceleration sensor 233 and the second acceleration sensor 243) of the first sensor 230 and the second sensor 240 in the low-power mode, a signal may be transmitted from the second portion to the first portion. Based on the signal, the first portion of the first sensor 230 and the second sensor 240 may be activated. Self-measuring of the position and/or angle may be performed in the low-power mode by the activated first portion.

According to an embodiment, if the operation mode of the electronic device 200 switches from the low-power mode to the active mode in the state in which the electronic device 200 is unfolded (e.g., if user input occurs), the processor 220 may wake up and enter an awake state. In addition, data on the position and/or angle measured by the first sensor 230 and the second sensor 240 themselves in the low-power mode may be transmitted to the processor 220 in response to switching from the low-power mode to the active mode. The processor 220 of the electronic device 200, based on the case where the operation mode switches from the low-power mode to the active mode, may obtain the data on the amount of change in position and/or angle and calculate the relative position and/or angle (e.g., a folding angle) of the first portion and the second portion in the display 260 using the obtained data.

According to an embodiment, in the low-power mode, the electronic device 200 may stand by without measuring the degree of change until movement is sensed. If movement of the electronic device 200 is sensed in the low-power mode, the first sensor 230 and the second sensor 240 themselves, independently of the processor 220, may (internally) measure the amount of change in position and/or angle and store the same. In the low-power mode, in order to reduce power, the data on the amount of change in position and/or angle measured by the first sensor 230 and the second sensor 240 may be processed by and stored inside the sensors themselves, instead of being transmitted to the outside of the sensors. Thereafter, if the electronic device 200 switches to the active mode, the data on the amount of change in position and/or angle measured during the low-power mode may be transmitted from the first sensor 230 and the second sensor 240 to the processor 220. The processor 220 may calculate the relative position and/or angle (e.g., a folding angle) between the first portion and the second portion of the display 260 using the data on the amount of change in position and/or angle, which is received from the first sensor 230 and the second sensor 240.

According to an embodiment, the electronic device 200 may perform various operations (e.g., a display function or a control function), based on the position and/or angle (or degree of change) measured using the first sensor 230 and the second sensor 240. For example, based on the folding angle measured through the first sensor 230 and the second sensor 240 of the electronic device 200, a portion (e.g., the main display 330 in FIG. 3A and the sub-display 350 in FIG. 3B) of the display 260 to be used may be selected from the display 260, or a display method (e.g., layout or full/partial screen modes) of a user interface to be displayed on the display 260 may be determined. A user interface may be displayed according to the determination.

Figure 9:
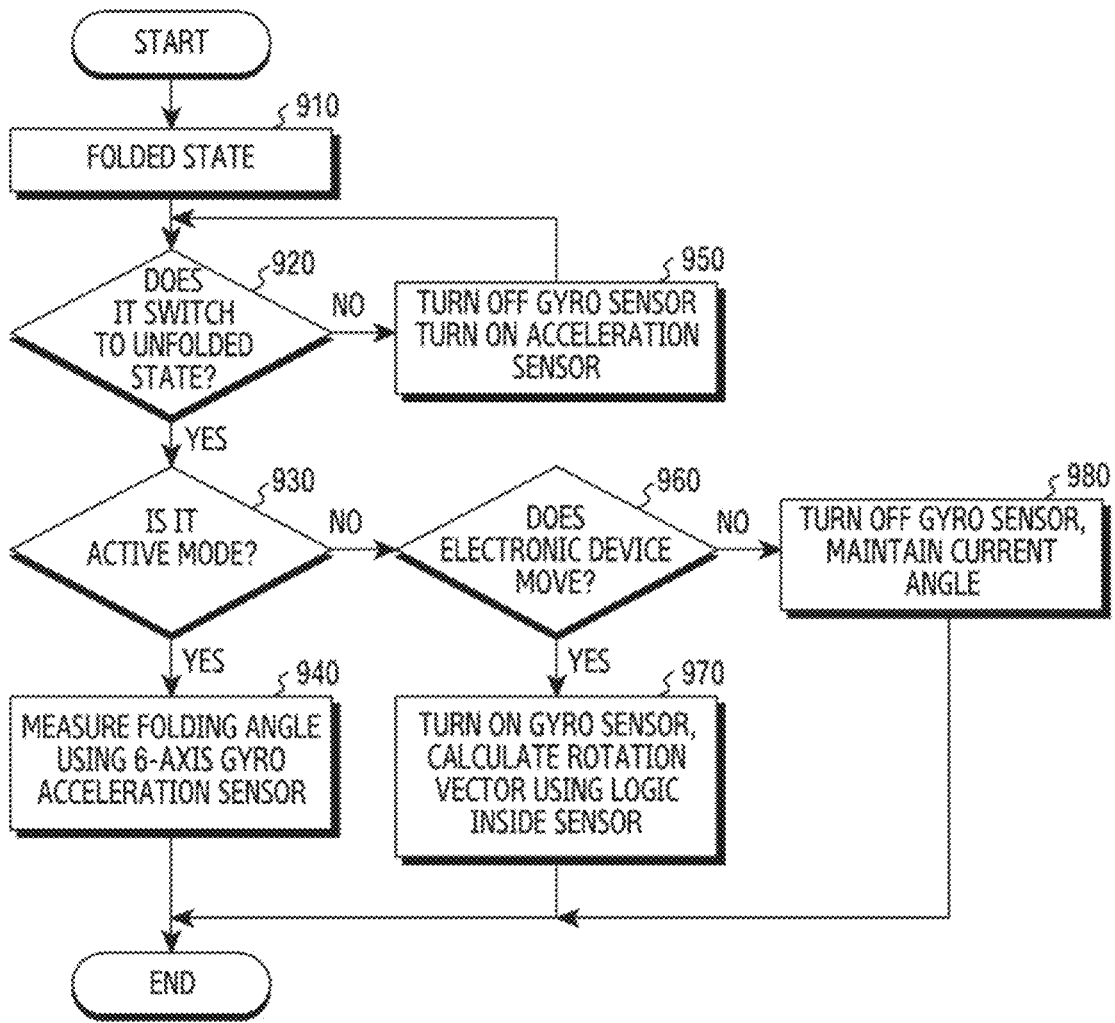
FIG. 9 is a flowchart illustrating an operation method of an electronic device according to an embodiment.

FIG. 9 is a flowchart illustrating an operation method of an electronic device according to an embodiment.

Operations in FIG. 9 to be described below may represent various embodiments of operations 810, 820, and 830 in FIG. 8. At least some of the operations in FIG. 9 may correspond to the operations described above in FIG. 8. For example, operation 920 may correspond to operation 810. Operation 940 may correspond to operations 820 and 830.

In the following embodiment, illustrated operations may be performed sequentially, but not necessarily sequentially. For example, the sequence of the operations may vary, or at least two operations may be performed in parallel. Alternatively, at least one of the illustrated operations may be omitted, the sequence of some operations may vary, or another operation may be added thereto.

In the following embodiment, although it is assumed that the first sensor 230 and the second sensor 240 for measuring the degree of change are 6-axis gyro acceleration sensors, the scope of the embodiment is not limited thereto.

According to an embodiment, the electronic device 200 (e.g., the processor 220) may perform a sensor control operation, based on the change state and operation mode of the electronic device 200.

According to an embodiment, in operation 910, the electronic device 200 or the display 260 of the electronic device 200 may be in a folded state. In the folded state, the first gyro sensor 235 in the first sensor 230 (6-axis gyro acceleration sensor) and the second gyro sensor 245 in the second sensor 240 (6-axis gyro acceleration sensor) may be deactivated (or turned off) to reduce power consumption. The first acceleration sensor 233 in the first sensor 230 (6-axis gyro acceleration sensor) and the second acceleration sensor 243 in the second sensor 240 (6-axis gyro acceleration sensor) may remain in the active (or on) state so as to be used in monitoring whether or not the electronic device 200 moves.

According to an embodiment, in the folded state, the electronic device 200 (e.g., the processor 220) may monitor whether or not the display 260 (or the electronic device 200) switches to the unfolded state using the third sensor 250 (e.g., a Hall sensor or a proximity sensor).

According to an embodiment, in the folded state, the third sensor 250 may measure a folding angle between the first portion and the second portion of the display 260. The third sensor 250 may transmit an interrupt signal to the processor 220 if the measured folding angle is greater than or equal to a specified first reference value (e.g., 10 degrees). The interrupt signal may be a signal indicating a switch to the unfolded state.

According to an embodiment, in operation 920, the electronic device 200 (e.g., the processor 220), based on whether or not an interrupt signal is received from the third sensor 250, may monitor (or determine) whether or not the display 260 switches from the folded state to the unfolded state. For example, if an interrupt signal is received from the third sensor 250, the processor 220 may determine that the display switched from the folded state to the unfolded state. The processor 220 may determine that the folded state is maintained if an interrupt signal is not received from the third sensor 250.

If the folded state is maintained as a result of monitoring in operation 920, operation 950 may be performed.

In operation 950, the first gyro sensor 235 in the first sensor 230 and the second gyro sensor 245 in the second sensor 240 may continue to remain in the inactive (or off) state. The first acceleration sensor 233 in the first sensor 230 and the second acceleration sensor 243 in the second sensor 240 may continue to remain in the active (or on) state to monitor whether or not the electronic device 200 moves.

If a switch is made from the folded state to the unfolded state as a result of monitoring in operation 920, operation 930 may be performed.

In operation 930, the processor 220 may identify whether or not the operation mode of the electronic device 200 is an active mode. For example, the operation mode of the electronic device 200 may be any one of a low-power mode and an active mode.

If the operation mode of the electronic device 200 is an active mode as a result of identification in operation 930, operation 940 may be performed.

In operation 940, the processor 220 may activate the first gyro sensor 235 in the first sensor 230 (6-axis gyro acceleration sensor) and the second gyro sensor 245 in the second sensor 240 (6-axis gyro acceleration sensor) and measure (or sense) a folding angle using the first sensor 230 and the second sensor 240.

As a result of identification in operation 930, if the operation mode of the electronic device 200 is a low-power mode, operation 960 may be performed.

In operation 960, the processor 220 may monitor whether or not the electronic device 200 moves through the first acceleration sensor 233 in the first sensor 230 (6-axis gyro acceleration sensor) and/or the second acceleration sensor 243 in the second sensor 240 (6-axis gyro acceleration sensor).

If movement of the electronic device 200 is not sensed as a result of monitoring in operation 960, operation 980 may be performed.

In operation 980, the first gyro sensor 235 in the first sensor 230 and the second gyro sensor 245 in the second sensor 240 may remain in the inactive (or off) state. The folding angle may be maintained at a current angle value (or a previous angle value).

If movement of the electronic device 200 is sensed as a result of monitoring in operation 960, operation 970 may be performed.

In operation 970, the processor 220 may activate the first gyro sensor 235 in the first sensor 230 (6-axis gyro acceleration sensor) and the second gyro sensor 245 ion the second sensor 240 (6-axis gyro acceleration sensor) and calculate a rotation vector (or the amount of change in angle corresponding to the rotation vector) using internal logic of the sensors.

According to an embodiment, operation 940 may be a change-degree measurement operation performed by the processor 220 outside the first sensor 230 and the second sensor 240 when the electronic device 200 is in the unfolded state and when the operation mode of the electronic device 200 is the active mode. The processor 220 may calculate a folding angle, based on measurement values received from the first sensor 230 and the second sensor 240.

According to an embodiment, operation 970 may be a measurement operation that is performed (internally) by the first sensor 230 and the second sensor 240 themselves when the electronic device 200 is in the unfolded state and when the operation mode of the electronic device 200 is the low-power mode. For example, operation 970 may be internally performed by each of the first sensor 230 and the second sensor 240 without interworking with the processor 220. Each of the first sensor 230 and the second sensor 240 may calculate and internally store the folding angle.

As shown in FIG. 2 described above, the first sensor 230 and the second sensor 240 may include sensor cores 231 and 241 for processing internal data. The sensor cores 231 and 241 may have a function of calculating the amount of change in position and/or angle by themselves in the low-power mode of the electronic device 200. When the electronic device 200 is in the low-power mode, the sensor may process data inside the sensor itself, thereby reducing power consumption due to a reduction in current consumption, compared to the case where the processor 220 outside the sensor transmits, receives, and/or computes sensor data.

According to an embodiment, while the low-power mode is maintained, the data on the amount of change in position and/or angle calculated through the sensor cores 231 and 241 of the first sensor 230 and the second sensor 240 may be internally stored in the sensor cores 231 and 241, instead of being transmitted to the external processor 220. There-movement is less than or equal to a predetermined level, the first sensor 230 and the second sensor 240 may deactivate (or turn off) the internal gyro sensors 235 and 245 by themselves to prevent unnecessary power consumption.

Table 1 below explains sensor control methods based on change states and operation modes of the electronic device 200 and shows a sensor control method for each situation of the electronic device 200 by way of example. For convenience, it is assumed that the first sensor 230 and the second sensor 240 are 6-axis gyro acceleration sensors having the structure shown in FIG. 2.

TABLE 1

| Change states | Operation modes of electronic device 200 | States of processor 220 | Acceleration sensors 233 and 243 | Gyro sensors 235 and 245 | Sensor cores 231 and 241 | Third sensor 250 |
|---|---|---|---|---|---|---|
| Folded state | Low power/active | Sleep/awake | ON | OFF | OFF | Monitoring |
| Unfolded state | Low power | Sleep | ON (no-move) | OFF | OFF | |
| | | | ON (move) | ON | ON (calculate) | |
| Unfolded state | Active | Awake (calculate angle) | ON | ON | ON | | after, as the electronic device 200 switches from the low-power mode to the active mode, the data on the amount of change in position and/or angle calculated through the sensor cores 231 and 241 in the low-power mode may be transmitted to the processor 220. The processor 200 may calculate a folding angle, based on the data on the amount of change in position and/or angle received from the sensor cores 231 and 241.

In the case where the sensor cores 231 and 241 are embedded inside the sensors as described above, the folding angle may be measured with low power consumption. In addition, even when switching from the low-power mode to the active mode, the folding angle may be measured using measurement data that is processed and/or stored inside the sensor itself.

In an embodiment, the electronic device 200 may sense the time of switching from the folded state to the unfolded state (e.g., the time at which the folding angle increases to about 10 degrees or more) using the third sensor 250 and activate the first sensor 230 and the second sensor 240 at that time, thereby enabling a change-degree measurement function.

According to an embodiment, in the low-power mode, the sensor cores 231 and 241 inside the first sensor 230 and the second sensor 240 may cumulatively calculate the amount of change in positional and/or angle. Thereafter, when the user views a screen (e.g., if a user input is sensed or if the display 260 is turned on), the low-power mode may switch to the active mode. Upon switching from the low-power mode to the active mode, the processor 220 outside the sensors may receive data on the amount of change in position and/or angle processed (or calculated) inside the sensor and calculate a final folding angle from the received data.

According to an embodiment, in the low-power mode, the first sensor 230 and the second sensor 240 may identify the amount of change in movement of the electronic device 200 through the internal acceleration sensors 233 and 243 (a movement monitoring function). If the amount of change in Referring to Table 1 above, the situations of the electronic device 200 may include a first situation, a second situation, and a third situation.

The first situation may be a situation in which the change state of the electronic device 200 (or the display 260) is the folded state and in which the operation mode is the low-power mode or the active mode. The second situation may be a situation in which the change state of the electronic device 200 is the unfolded state and in which the operation mode is the low-power mode. The third situation may be a situation in which the change state of the electronic device 200 is the unfolded state and in which the operation mode is the active mode.

In an embodiment, the state of the processor 220 may vary depending on the operation mode of the electronic device 200. In the low-power mode, the processor 220 may be in a sleep state (driving stop state). In the active mode, the processor 220 may be in an awake state (driving state). According to an embodiment, in the first situation in which the change state of the electronic device 200 is the folded state (or closed state) and in which the operation mode is one of the low-power mode and the active mode, the processor 220 may be in one of the sleep state and the awake state. In the folded state, the acceleration sensors 233 and 243 of the first sensor 230 and the second sensor 240 may be turned on. In the folded state, the gyro sensors 235 and 245 and the sensor cores 231 and 241 may be turned off. The third sensor 250 may remain in the on state, regardless of the operation mode in the folded state, and sense whether or not switching to the unfolded state is performed. The processor 220 may perform a change state monitoring function using the third sensor 250.

In the situation where the electronic device 200 is not used, an operation of calculating the amount of change in position and/or angle by the sensor cores 231 and 241 themselves may also cause unnecessary power consumption. In the situation where the electronic device 200 is not used, measurement (or real-time measurement) of the degree of change (e.g., a folding angle) may be unnecessary.

Accordingly, the electronic device 200 according to an embodiment may monitor the change state of the electronic device 200 and/or whether or not the change state switches using the third sensor 250, and at least partially deactivate the first sensor 230 and the second sensor 240 in the situation where the electronic device 200 is not used, thereby disabling the change-degree measurement function.

For example, referring to Table 1, the situation in which the electronic device 200 is not used may be the first situation in which the device 200 is in the folded state. In the first situation, the electronic device 200 may deactivate the gyro sensors 235 and 245 of the first sensor 230 and the second sensor 240 to disable the change-degree measurement function.

According to an embodiment, in the second situation in which the change state of the electronic device 200 is the unfolded state (e.g., a fully unfolded state or a partially unfolded state) and in which the operation mode is the low-power mode, the processor 220 may be in a sleep state. The acceleration sensors 233 and 243 of the first sensor 230 and the second sensor 240 may be turned on to sense whether or not the electronic device 200 moves. If movement of the electronic device 200 is not sensed through the acceleration sensors 233 and 243, the gyro sensors 235 and 245 and the sensor cores 231 and 241 may remain in the off state. If the movement of the electronic device 200 is sensed through the acceleration sensors 233 and 243, the gyro sensors 235 and 245 and the sensor cores 231 and 241 may be turned on to process and/or store data on the amount of change in position and/or angle.

According to an embodiment, in the second situation in which the electronic device 200 is in the unfolded state but in the low-power mode, the electronic device 200 may maintain the acceleration sensors 233 and 243 of the first sensor 230 and the second sensor 240 in the on state to sense whether or not the electronic device 200 moves. If movement of the electronic device 200 is sensed in the second situation, the electronic device 200 may turn on the gyro sensors 235 and 245 of the first sensor 230 and the second sensor 240.

For example, if the folding angle is maintained without change but if movement of the electronic device 200 occurs during the low-power mode (e.g., if the user lifts or puts the electronic device 200 down or if the electronic device 200 switches from the tent mode in FIG. 5A to the book mode in FIG. 5B), measurement accuracy of the folding angle may be lowered may be lowered due to the change in the position of the electronic device 200 when switching to the active mode.

Referring to Table 1, if the movement of the electronic device 200 is sensed in the second situation in which the electronic device is in the unfolded state but in the low-power mode, the electronic device 200 may activate the gyro sensors 235 and 245 and the sensor cores 231 and 241 of the first sensor 230 and the second sensor 240 to measure (or calculate) the position and/or angle. Since the processor 220 is in the sleep state in the low-power mode, data on the measured position and/or angle may be stored in the sensor cores 231 and 241, instead of being transmitted to the processor 220. If the electronic device 200 switches to the active mode so that the processor 220 wakes up, the data on position and/or angle stored in the sensor cores 231 and 241 during the low-power mode may be transmitted to the processor 220.

According to an embodiment, in the third situation in which the change state of the electronic device 200 is the unfolded state (e.g., a fully unfolded state or a partial unfolded state) and in which the operation mode is the active mode, the acceleration sensors 233 and 243, the gyro sensors 235 and 245, and the sensor cores 231 and 241 of the first sensor 230 and the second sensor 240 may all be turned on. The processor 220 in the awake state may calculate the degree of change (e.g., a folding angle) of the display 260 using the first sensor 230 and the second sensor 240.

However, the sensor control methods for respective situations presented in Table 1 above are only an example to help understanding, and the embodiments of the disclosure are not limited thereto. For example, it is possible to control whether to activate and/or deactivate the first sensor 230 and the second sensor 240, based on whether or not the change state (e.g., the folded state and the unfolded state) switches, regardless of the operation mode of the electronic device 200.

Figure 10:
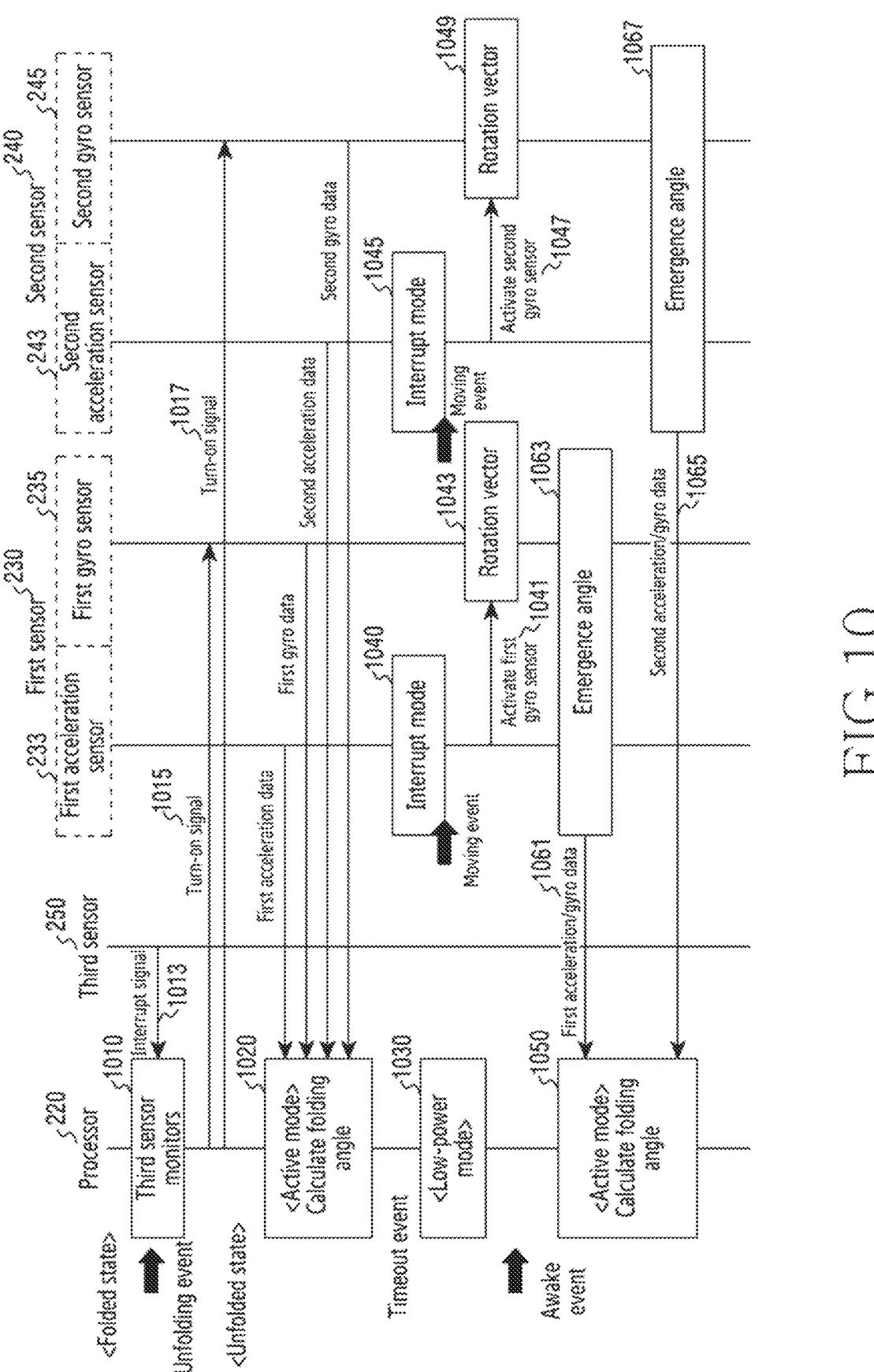
FIG. 10 is a flowchart illustrating an operation method of an electronic device according to an embodiment.

FIG. 10 is a flowchart illustrating an operation method of an electronic device according to an embodiment.

Operations in FIG. 10 to be described below may represent various embodiments of operations 810, 820, and 830 in FIG. 8. At least some of the operations in FIG. 10 may correspond to the operations described above in FIG. 8. For example, operations 1010 and 1013 in FIG. 10 may correspond to operation 810 in FIG. 8. Operations 1015 and 1017 in FIG. 10 may correspond to operation 820 in FIG. 8. Operations 1020 and 1050 in FIG. 10 may correspond to operation 830 in FIG. 8.

In the following embodiment, illustrated operations may be performed sequentially, but not necessarily sequentially. For example, the sequence of the operations may vary, or at least two operations may be performed in parallel. Alternatively, at least one of the illustrated operations may be omitted, the sequence of some operations may vary, or another operation may be added thereto.

In the following embodiment, it is assumed that the first sensor 230 and the second sensor 240 for measuring the degree of change are 6-axis gyro acceleration sensors including an acceleration sensor and a gyro sensor, respectively. However, the scope of the embodiment is not limited thereto.

Referring to FIG. 10, various events related to monitoring change states (e.g., the folded state and the unfolded state) and/or measuring the degree of change (e.g., a folding angle) are illustrated.

In an embodiment in FIG. 10, an unfolding event may be an event that occurs by a user's unfolding action of unfolding the electronic device 200 (or the display 260).

In an embodiment, a timeout event may be an event that occurs when there is no user input (e.g., touch input, physical key input, or gesture) or operation (e.g., a folding/unfolding operation) for a predetermined time. If a timeout event occurs, the electronic device 200 may automatically switch from the active mode to the low-power mode.

In an embodiment, an awake event may be an event that switches the operation mode of the electronic device 200 from the low-power mode to the active mode. For example, an awake event may occur due to user input (e.g., touch input, physical key input, or gesture), reception of an alarm through communication, notification by an application, and the like.

In an embodiment, a moving event may be an event that occurs due to movement of the electronic device 200.

In an embodiment, the processor 220 of the electronic device 200 may control one or more sensors 230, 240, and 250, based on the change state of the electronic device 200 (or the display 260) and the operation mode of the electronic device 200. The change state of the electronic device 200 (or the display 260) may be any one of the folded state and the unfolded state. The operation mode of the electronic device 200 may be any one of the low-power mode and the active mode.

According to an embodiment, in the active mode, the processor 220 of the electronic device 200 may be in an awake state, and both the first sensor 230 and the second sensor 240 may be in an on state.

According to an embodiment, in the low-power mode, the processor 220 of the electronic device 200 may be in a sleep state, and the first sensor 230 and the second sensor 240 may be at least partially in an off state. For example, the gyro sensors 235 and 245 that are sensors having a relatively large current consumption, among the internal sensors of the first sensor 230 and the second sensor 240, may be turned off.

According to an embodiment, the third sensor 250 may remain in the on state even in the low-power mode to sense whether or not the change state switches.

Referring to FIG. 10, in an initial operation 1010, the change state of the electronic device 200 may be the folded state.

According to an embodiment, in the folded state, the first gyro sensor 235 of the first sensor 230 and the second gyro sensor 245 of the second sensor 240 may be turned off (or deactivated). The operation mode of the electronic device 200 may be the active mode. In the active mode, the processor 220 may be driven (in the awake state) and perform operation 1010.

Operation 1010 may correspond to a change state monitoring operation.

In operation 1010, the processor 220 (e.g., the main processor 221 or the sub-processor 225 in FIG. 2) of the electronic device 200 may monitor the change state of the display 260 (or the electronic device 200) through the third sensor 250. For example, the processor 220 may monitor whether or not the display 260 switches from the folded state to the unfolded state, based on whether or not an interrupt signal is received from the third sensor 250.

According to an embodiment, an unfolding event may occur as a user performs an unfolding operation of unfolding the display 260 in the folded state of the display 260. The change state of the electronic device 200 may switch from the folded state to the unfolded state (e.g., a fully unfolded state or a partially unfolded state) by the user's unfolding operation. If an unfolding event occurs, operation 1013 may be performed.

In operation 1013, the third sensor 250 may sense the unfolding event and, in response to the unfolding event, transmit (or output) an interrupt signal to the processor 220. For example, if an unfolding event occurs, the third sensor 250 may sense that the folding angle of the display 260 increases to a specified reference value (e.g., 10 degrees) or more. The third sensor 250 may output an interrupt signal in response to the sensing.

In operations 1015 and 1017, the processor 220 may transmit a turn-on signal to the first sensor 230 and the second sensor 240 in response to the interrupt signal received from the third sensor 250. The turn-on signal may be a signal for waking up (for activating) the first gyro sensor 235 of the first sensor 230 and the second gyro sensor 245 of the second sensor 240. In response to the turn-on signal from the processor 220, the first gyro sensor 235 of the first sensor 230 and the second gyro sensor 245 of the second sensor 240 may be turned on (or activated).

In an embodiment, as the unfolding event occurs, the change state of the electronic device 200 may switch from the folded state to the unfolded state. The operation mode of the electronic device 200 may remain in the active mode.

According to an embodiment, operation 1020 may be performed in a situation where the operation mode of the electronic device 200 is the active mode and where the change state of the electronic device 200 is the unfolded state. Operation 1020 may correspond to an operation of measuring the degree of change (e.g., a folding angle).

In operation 1020, the processor 220 of the electronic device 200 may receive first acceleration data and first gyro data from the first sensor 230, and receive second acceleration data and second gyro data from the second sensor 240. The processor 220 may calculate a folding angle of the display 260, based on the first acceleration data, the first gyro data, the second acceleration data, and the second gyro data. The processor 220 may perform various operations (e.g., a display operation and a control operation), based on the calculated folding angle.

According to an embodiment, a timeout event may occur in the unfolded state of the electronic device 200. For example, a timeout event may occur if there is no user input for a predetermined time in the unfolded state. If a timeout event occurs, the electronic device 200 may switch from the active mode to the low-power mode in operation 1030.

According to an embodiment, in the low-power mode, the processor 220 may stop its operation. The processor 220 may switch from an awake state to a sleep state.

According to an embodiment, in the low-power mode, the first gyro sensor 235 of the first sensor 230 and the second gyro sensor 245 of the second sensor 240 may be turned off (or deactivated) to reduce current consumption. In the low-power mode, the first acceleration sensor 233 of the first sensor 230 and the second acceleration sensor 243 of the second sensor 240 may remain in the on (or active) state to monitor whether or not the electronic device 200 moves (operation 1040 and operation 1045).

In operation 1040, the first sensor 230 may operate in an interrupt mode (or a movement monitoring mode). In the interrupt mode, only the first acceleration sensor 233 among the first acceleration sensor 233 and the first gyro sensor 235 of the first sensor 230 may be activated to monitor whether or not the electronic device 200 moves.

According to an embodiment, a movement event may occur when the electronic device 200 is in the low-power mode. For example, a movement event may occur due to movement of the electronic device 200 in a stationary state by a user or an external force. If the occurrence of a movement event is sensed in the interrupt mode of the first sensor 230, operation 1041 may be performed.

In operation 1041, the first acceleration sensor 233 of the first sensor 230 may output an interrupt signal in response to the movement event to wake up (activate) the first gyro sensor 235 therein.

In operation 1043, the activated first gyro sensor 235 may calculate (or measure) a rotation vector (or the amount of change in angle corresponding to the rotation vector) using internal logic. In the low-power mode, sensor data of the first gyro sensor 235 may be processed by and/or stored in the first sensor 230 itself, instead of being transmitted to the external processor 220. If the sensor data is internally processed, current consumption may be reduced compared to the case where the sensor data is transmitted to and processed by the external processor 220.

In operation 1045, the second sensor 240 may operate in an interrupt mode (or a movement monitoring mode). In the interrupt mode, only the second acceleration sensor 243 among the second acceleration sensor 243 and the second gyro sensor 245 of the second sensor 240 may be activated to monitor whether or not the electronic device 200 moves. The second acceleration sensor 243 may sense the occurrence of a movement event in the interrupt mode. If the occurrence of a movement event is sensed in the interrupt mode of the second sensor 240, operation 1047 may be performed.

In operation 1047, the second acceleration sensor 243 of the second sensor 240 may output an interrupt signal in response to the movement event to wake up (activate) the internal second gyro sensor 245.

In operation 1049, the activated second gyro sensor 245 may calculate (or measure) a rotation vector (or the amount of change in angle corresponding to the rotation vector) using internal logic. In the low-power mode, sensor data of the second gyro sensor 245 may be processed by and/or stored in the second sensor 240 itself, instead of being transmitted to the external processor 220. If the sensor data is internally processed, current consumption may be reduced compared to the case where the sensor data is transmitted to and processed by the external processor 220.

After entering the low-power mode in operation 1030, an awake event may occur. For example, an awake event may occur due to user input (e.g., touch input, physical key input, or gesture), reception of an alarm through communication, notification by an application, and the like. In response to the awake event, the electronic device 200 may switch from the low-power mode to the active mode.

According to an embodiment, as the electronic device 200 switches from the low-power mode to the active mode, operations 1050, 1061, 1063, 1065, and 1067 may be performed.

In an embodiment, as the electronic device 200 switches to the active mode, the processor 220 may switch from the sleep state to the awake state so as to be driven again.

In an embodiment, as the electronic device 200 switches to the active mode, the interrupt mode (or movement monitoring mode) of the first sensor 230 and the second sensor 240 may be released. In the active mode, the first sensor 230 and the second sensor 240 may transmit, receive, and/or process sensor data by interworking with the processor 220 outside the sensors.

In operation 1063, the first sensor 230 may merge first acceleration data obtained through the first acceleration sensor 233 and second gyro data obtained through the second gyro sensor 245 to calculate a mergence angle. In operation 1061, the first sensor 230 may transmit the calculated mergence angle or first acceleration data and first gyro data corresponding to the mergence angle to the processor 220.

In operation 1067, the second sensor 240 may merge second acceleration data obtained through the second acceleration sensor 243 and second gyro data obtained through the second gyro sensor 245 to calculate a mergence angle. In operation 1065, the second sensor 240 may transmit the calculated mergence angle or second acceleration data and second gyro data corresponding to the mergence angle to the processor 220.

According to an embodiment, in the active mode, the processor 220 may obtain control authority for the first sensor 230 and the second sensor 240 and perform operation 1050. Operation 1050 may correspond to an operation of measuring the degree of change (e.g., a folding angle).

In operation 1050, the processor 220 may finally calculate (or measure) a folding angle of the display 260, based on first acceleration data and first gyro data received from the first sensor 230, and second acceleration data and second gyro data received from the second sensor 240. The processor 220 may perform various operations (e.g., a display operation and a control operation), based on the calculated folding angle.

Figure 11A:
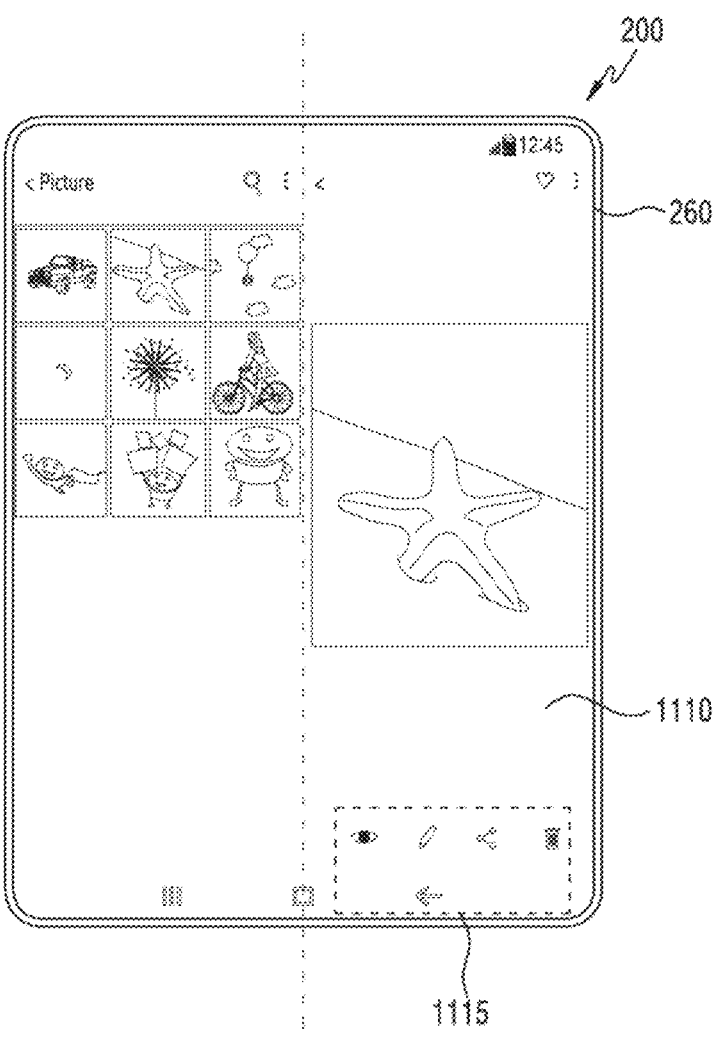
FIGS. 11A and 11B are diagrams illustrating user interfaces displayed based on a degree of change in an electronic device according to an embodiment.
Figure 11B:
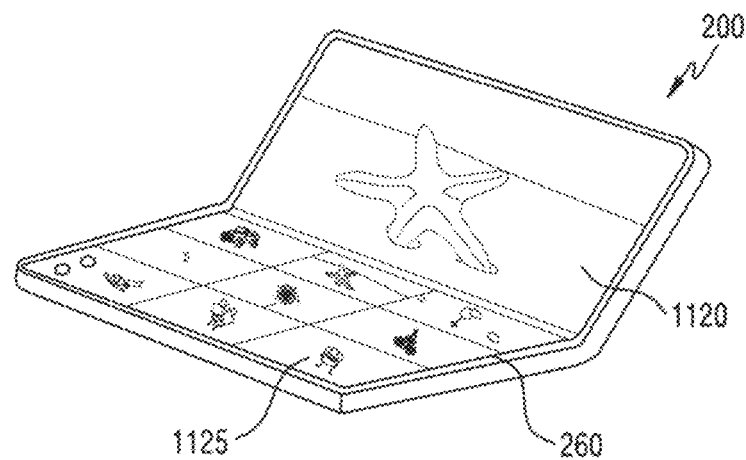

FIGS. 11A and 11B are diagrams illustrating user interfaces displayed based on a degree of change in an electronic device according to an embodiment.

Referring to FIG. 11A, the electronic device 200 may display a user interface such as a first screen 1110 through the display 260 in a fully unfolded state (or fully open state). For example, the first screen 1110 may be a first execution screen of a gallery application.

Referring to FIG. 11B, the electronic device 200 may display a user interface such as a second screen 1120 through the display 260 in a partially unfolded state. For example, the second screen 1120 may be a second execution screen of the gallery application.

In an embodiment, the display 260 of the electronic device 200 may include a first portion and a second portion that are changeable relative to each other in position and/or angle. The degree of change of the electronic device 200 may correspond to a relative position and/or angle (e.g., a folding angle) between the first portion and the second portion of the display 260.

In an embodiment, when the change state is the unfolded state (e.g., the state in which the folding angle is 10 degrees or more), the electronic device 200 may measure the folding angle in real time, thereby increasing measurement accuracy, and display a user interface conforming to the user's intention or situation, based on the folding angle, thereby improving usability.

For example, the electronic device 200 may determine the change state of the electronic device 200, based on the folding angle, in an environment of executing applications providing functions such as web surfing, video playback, and music playback and provide different user interfaces depending on the determination. The first screen 1110 and the second screen 1120 illustrate user interfaces displayed in different ways depending on the folding angle and/or the change state.

In an embodiment, when the electronic device 200 is in a fully unfolded state (or a fully open state) (e.g., the folding angle is 180 degrees) as shown in FIG. 11A, a first screen 1110 may be provided to be displayed on the entire surface of the display 260 such as a full touch phone. The first screen 1110 may include a photo list showing several photos. If one photo is selected from the list by a user, the corresponding photo may be enlarged and displayed. Various menus 1115 for user manipulation may be displayed under the enlarged photo.

In an embodiment, when the electronic device 200 is in a partially unfolded state (e.g., the folding angle is 90 degrees to 180 degrees) as shown in FIG. 11B, a photo list may be displayed on the lower screen and an enlarged photo may be displayed on the upper screen as shown. In this case, even if the user does not press a back key in the upper screen on which the enlarged photo is displayed, the user may intuitively select and enlarge a desired photo 1125 on the lower screen, thereby improving operational convenience.

An electronic device (e.g., the electronic device 101 in FIG. 1 or the electronic device 200 in FIGS. 2 and 3A) according to various embodiments may include a housing (e.g., the housing 310 in FIG. 3A), a flexible display (e.g., the display 260 in FIG. 2 or the main display 330 in FIG. 3A) including a first portion and a second portion, a first sensor (e.g., the first sensor 230 in FIG. 2) and a second sensor (e.g., the second sensor 240 in FIG. 2) disposed in the housing, a third sensor (e.g., the third sensor 250 in FIG. 2) disposed in the housing, at least one processor operatively connected to the flexible display, the first sensor, the second sensor, and the third sensor, and a memory operatively connected to the at least one processor. The memory may store instructions that, when executed, cause the at least one processor to monitor whether or not the flexible display switches from a folded state to an unfolded state using the third sensor, at least partially activate the first sensor and the second sensor, based on the case where the flexible display switches from the folded state to the unfolded state, and measure relative position and/or angle of the first portion and the second portion in the flexible display using the first sensor and the second sensor. According to various embodiments, the relative position and/or angle is measured between the first portion and the second portion of the flexible display.

According to various embodiments, the first sensor may include a first gyro sensor. The second sensor may include a second gyro sensor. Gyro sensors are also called angular rate sensors or angular velocity sensors. Gyro sensors have the advantage that they can measure relative position and/or angle of the first portion and the second portion in the flexible display even in a vertical position and/or when there is a lot of physical vibration around the electronic device.

According to various embodiments, the first sensor may further include a first acceleration sensor. The second sensor may further include a second acceleration sensor. Acceleration sensors may correct the measurements of the gyro sensor. Acceleration sensors may have a lower power consumption than gyro sensors.

According to various embodiments, the first acceleration sensor and the second acceleration sensor may be activated and the first gyro sensor and the second gyro sensor may be at least partially deactivated in the folded state. The first acceleration sensor, the second acceleration sensor, the first gyro sensor, and the second gyro sensor may all be activated in the unfolded state. In the folded state the power consumption becomes an important factor and thus the partial deactivation of the gyro sensors which have high power requirements would improve battery life in the folded state.

According to various embodiments, the first acceleration sensor and the second acceleration sensor may be configured to activate and the first gyro sensor and the second gyro sensor may be configured to at least partially deactivate in the folded state. The first acceleration sensor, the second acceleration sensor, the first gyro sensor, and the second gyro sensor may all be configured to activate in the unfolded state.

According to various embodiments, the instructions may cause, when executed, the at least one processor to activate the first acceleration sensor and the second acceleration sensor and at least partially deactivate and the first gyro sensor and the second gyro sensor in the folded state. According to various embodiments, the instructions may cause, when executed, the at least one processor to activate all of the first acceleration sensor, the second acceleration sensor, the first gyro sensor, and the second gyro sensor in the unfolded state.

According to various embodiments, the third sensor may include a Hall sensor or a proximity sensor. According to various embodiments, the third sensor may include means for sensing whether or not the change state switches. For example, the change state may include a folded state and an unfolded state. A Hall sensor or a proximity sensor is a way of sensing a switching of change state of the electronic device with low power requirements, thus improving battery life.

According to various embodiments, the instructions may cause, when executed, the at least one processor to receive a first interrupt signal from the third sensor in response to an unfolding event and determine that the flexible display switched from the folded state to the unfolded state, based on the first interrupt signal.

According to various embodiments, the instructions may cause, when executed, the at least one processor to at least partially deactivate the first sensor and the second sensor, based on the case where the flexible display switches from the unfolded state to the folded state.

According to various embodiments, the instructions may cause, when executed, the at least one processor to receive a second interrupt signal from the third sensor in response to a folding event and determine that the flexible display switched from the unfolded state to the folded state, based on the second interrupt signal.

According to various embodiments, the first sensor and the second sensor are at least partially activated or deactivated further based on an operation mode of the electronic device. The operation mode may include a low-power mode and an active mode.

According to various embodiments, the first sensor and the second sensor are configured to at least partially activate or deactivate further based on an operation mode of the electronic device.

According to various embodiments, the instructions may cause, when executed, the at least one processor to further at least partially activate or deactivate the first sensor and the second sensor based on an operation mode of the electronic device.

According to various embodiments, if the operation mode of the electronic device switches to the low-power mode, the at least one processor may enter a sleep state, a first portion of the first sensor and the second sensor may be deactivated, and a second portion of the first sensor and the second sensor may sense whether or not the electronic device moves in an active state. A signal may be transmitted from the second portion to the first portion in response to sensing movement of the electronic device. The first portion may be activated based on the signal. Self-measuring position and/or angle may be performed by the activated first portion. If the operation mode of the electronic device switches to the active mode, the at least one processor may enter an awake state, and data on the self-measured position and/or angle may be transmitted to the at least one processor.

An operation method of an electronic device according to various embodiments may include monitoring whether or not a flexible display of the electronic device switches from a folded state to an unfolded state using a third sensor in the electronic device, at least partially activating a first sensor and a second sensor in the electronic device, based on the case where the flexible display switches from the folded state to the unfolded state, and measuring relative position and/or angle of a first portion and a second portion in the flexible display using the first sensor and the second sensor.

According to various embodiments, the first sensor may include a first gyro sensor. The second sensor may include a second gyro sensor.

According to various embodiments, the first sensor may further include a first acceleration sensor. The second sensor may further include a second acceleration sensor.

According to various embodiments, the first acceleration sensor and the second acceleration sensor may be activated and the first gyro sensor and the second gyro sensor may be at least partially deactivated in the folded state. The first acceleration sensor, the second acceleration sensor, the first gyro sensor, and the second gyro sensor may all be activated in the unfolded state.

According to various embodiments, the third sensor may include a Hall sensor or a proximity sensor.

According to various embodiments, the monitoring may include receiving a first interrupt signal from the third sensor in response to an unfolding event and determining that the flexible display switched from the folded state to the unfolded state, based on the first interrupt signal.

According to various embodiments, the method may further include at least partially deactivating the first sensor and the second sensor, based on the case where the flexible display switches from the unfolded state to the folded state.

According to various embodiments, the method may include receiving a second interrupt signal from the third sensor in response to a folding event and determining that the flexible display switched from the unfolded state to the folded state, based on the second interrupt signal.

According to various embodiments, the first sensor and the second sensor may be at least partially activated or deactivated further based on an operation mode of the electronic device. The operation mode may include a low-power mode and an active mode.

According to various embodiments, in the method, if the operation mode of the electronic device switches to the low-power mode, at least one processor in the electronic device may enter a sleep state, a first portion of the first sensor and the second sensor may be deactivated, and a second portion of the first sensor and the second sensor may sense whether or not the electronic device moves in an active state. A signal may be transmitted from the second portion to the first portion in response to sensing movement of the electronic device. The first portion may be activated based on the signal. Self-measuring position and/or angle may be performed by the activated first portion. If the operation mode of the electronic device switches to the active mode, the at least one processor may enter an awake state, and data on the self-measured position and/or angle may be transmitted to the at least one processor.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

a foldable housing;

a flexible display supported by the foldable housing, the flexible display comprising a first portion and a second portion;

a first sensor and a second sensor disposed in the foldable housing;

a third sensor disposed in the foldable housing;

at least one processor; and memory storing instructions that, when executed by the at least one processor individually or collectively, cause the electronic device to:

based on a determination that the flexible display is in a folded state, at least partially deactivate a first sensing portion of the first sensor and the second sensor, detect an event to switch the flexible display from the folded state to an unfolded state using the third sensor;

detect a movement of the foldable housing using a second sensing portion of the first sensor and the second sensor, activate the first sensing portion based on the detection of the event and the detection of the movement of the foldable housing; and measure at least one of a relative position or an angle of the first portion and the second portion in the flexible display using the first sensing portion and the second sensing portion.

2. The electronic device of claim 1, wherein the first sensor comprises a first gyro sensor, wherein the second sensor comprises a second gyro sensor, and wherein the first sensing portion corresponds to the first gyro sensor and the second gyro sensor.

3. The electronic device of claim 2, wherein the first sensor further comprises a first acceleration sensor, wherein the second sensor further comprises a second acceleration sensor, and wherein the second sensing portion corresponds to the first acceleration sensor and the second acceleration sensor.

4. The electronic device of claim 3, wherein the instructions, when executed by the at least one processor individually or collectively, cause the electronic device to:

based on the determination that the flexible display is in the folded state, have the first acceleration sensor and the second acceleration sensor at least partially remain active and deactivate the first gyro sensor and the second gyro sensor.

5. The electronic device of claim 1, wherein the third sensor comprises a Hall sensor or a proximity sensor.

6. The electronic device of claim 1, wherein the instructions, when executed by the at least one processor individually or collectively, cause the electronic device to:

receive a first interrupt signal from the third sensor in response to the event; and determine that the flexible display switched from the folded state to the unfolded state, based on the first interrupt signal.

7. The electronic device of claim 1, wherein the instructions, when executed by the at least one processor individually or collectively, cause the electronic device to at least partially deactivate the first sensor and the second sensor, based on the flexible display switching from the unfolded state to the folded state.

8. The electronic device of claim 7, wherein the instructions, when executed by the at least one processor individually or collectively, cause the electronic device to:

receive a second interrupt signal from the third sensor in response to another event to switch the flexible display from the unfolded state to the folded state; and determine that the flexible display switched from the unfolded state to the folded state, based on the second interrupt signal.

9. The electronic device of claim 1, wherein the instructions, when executed by the at least one processor individually or collectively, cause the electronic device to:

perform the measurement of the at least one of the relative position or the angle based on an operation mode of the electronic device, and the operation mode comprises a low-power mode and an active mode.

10. The electronic device of claim 9, wherein the instructions, when executed by the at least one processor, cause the electronic device to:

obtain data with respect to an amount of the movement of the foldable housing using the activated first sensing portion and the second sensing portion while the operation mode of the electronic device is the low-power mode; and perform the measurement of the at least one of the relative position or the angle using the data, if the operation mode of the electronic device switches from the low-power mode to the active mode.

11. An operation method of an electronic device, the operation method comprising:

based on a determination that a flexible display of the electronic device is in a folded state, at least partially deactivating a first sensing portion of a first sensor of the electronic device and a second sensor of the electronic device;

detecting an event to switch the flexible display from the folded state to an unfolded state using a third sensor in the electronic device;

detecting a movement of a foldable housing of the electronic device using a second sensing portion of the first sensor and the second sensor;

activating the first sensing portion based on the detecting of the event and the detecting of the movement of the foldable housing; and measuring at least one of a relative position or an angle of a first portion and a second portion in the flexible display using the first sensing portion and the second sensing portion.

12. The operation method of claim 11, wherein the first sensor comprises a first gyro sensor, wherein the second sensor comprises a second gyro sensor, and wherein the first sensing portion corresponds to the first gyro sensor and the second gyro sensor.

13. The operation method of claim 11, wherein the third sensor comprises a Hall sensor or a proximity sensor.

14. The operation method of claim 11, wherein the detecting the event comprises:

receiving a first interrupt signal from the third sensor in response to the event; and determining that the flexible display switched from the folded state to the unfolded state, based on the first interrupt signal.

15. The operation method of claim 11, further comprising at least partially deactivating the first sensor and the second sensor, based on the flexible display switching from the unfolded state to the folded state.

\* \* \* \* \*